(12) United States Patent
Ge et al.

(10) Patent No.: US 9,072,126 B2
(45) Date of Patent: Jun. 30, 2015

(54) OPEN-CIRCUIT PROTECTION CIRCUIT OF CONSTANT CURRENT DRIVING CIRCUIT FOR LIGHT EMITTING DIODES

(75) Inventors: Liang'an Ge, Zhejiang (CN); Xiaoli Yao, Zhejiang (CN)

(73) Assignee: INVENTRONICS (HANGZHOU), INC., Hangzhou, Zhejiang (CN)

( * ) Notice: Subject to any disclaimer, the term of this patent is extended or adjusted under 35 U.S.C. 154(b) by 236 days.

(21) Appl. No.: 13/814,771
(22) PCT Filed: Dec. 31, 2010
(86) PCT No.: PCT/CN2010/080618
§ 371 (c)(1),
(2), (4) Date: Feb. 7, 2013
(87) PCT Pub. No.: WO2012/022106
PCT Pub. Date: Feb. 23, 2012

(65) Prior Publication Data
US 2013/0154482 A1 Jun. 20, 2013

(30) Foreign Application Priority Data
Aug. 16, 2010 (CN) .......................... 2010 1 0257482

(51) Int. Cl.
*H05B 37/00* (2006.01)
*H05B 41/00* (2006.01)
(Continued)

(52) U.S. Cl.
CPC ............ *H05B 37/02* (2013.01); *H05B 33/0887* (2013.01); *Y02B 20/341* (2013.01); *H05B 33/0815* (2013.01)

(58) Field of Classification Search
CPC ........ H05B 37/00; H05B 37/02; H05B 39/00; H05B 33/0887; H05B 33/0815; Y02B 20/341; Y02B 20/342
USPC ........................... 315/121, 160, 161, 172, 176
See application file for complete search history.

(56) References Cited

U.S. PATENT DOCUMENTS 8,866,394 B2 * 10/2014 Wu et al. ........................ 315/188
(Continued)

FOREIGN PATENT DOCUMENTS

CN 101686591 A 3/2010
CN 101702854 A 5/2010
(Continued)

OTHER PUBLICATIONS

International Search Report (in Chinese with English translation) and Written Opinion (in Chinese) for PCT/CN2010/080618, mailed May 26, 2011; ISA/CN.

*Primary Examiner* — Hai L Nguyen
(74) *Attorney, Agent, or Firm* — Harness, Dickey & Pierce, P.L.C.

(57) ABSTRACT

A open-circuit protection circuit of a constant current driving circuit for light emitting diodes is disclosed, which includes that: a transformer (Ta1), which has at least one secondary winding (WT1), is connected to at least two load branches (A1, A2); a commutating loop is composed of each load branches (A1, A2) and one secondary winding (WT1), wherein the secondary winding (WT1) has tap ends; a current sharing transformer (T1) is set in two neighbor load branch (A1, A2); each load branch (A1, A2) is separately connected to one open-circuit protection module (10). The open circuit protection module (10) includes: a detection control unit (101), used for outputting a control signal to a processing unit (102) when the detection control unit detects that the output voltages of each load branch (A1, A2) or the voltages proportionate to the output voltages are not less than a corresponding preset threshold; the processing unit (102), used for shorting one secondary sub winding (WT11, WT12) in the corresponding load branch (A1, A2) and a sharing current winding (W1) of the current sharing transformer (T1) in series with the secondary sub winding (WT11, WT12) when receiving the control signal. With the embodiments of the present invention, the cost and the bulk of the current sharing transformer (T1) can be reduced.

14 Claims, 14 Drawing Sheets

(51) Int. Cl.
*H05B 37/02* (2006.01)
*H05B 33/08* (2006.01)

(56) References Cited

U.S. PATENT DOCUMENTS

2008/0164828 A1 7/2008 Szczeszynski et al.
2010/0060175 A1 3/2010 Lethellier
2012/0274136 A1 11/2012 Ge et al.
2012/0274291 A1 11/2012 Ge et al.

FOREIGN PATENT DOCUMENTS

| CN | 101820710 A | 9/2010 |
| CN | 201766752 U | 3/2011 |
| WO | WO-2011060701 A1 | 5/2011 |

* cited by examiner

OPEN-CIRCUIT PROTECTION CIRCUIT OF CONSTANT CURRENT DRIVING CIRCUIT FOR LIGHT EMITTING DIODES

This application is a 371 National Phase of International Application No. PCT/CN2010/080618, titled "OPEN-CIRCUIT PROTECTION CIRCUIT OF CONSTANT CURRENT DRIVING CIRCUIT FOR LIGHT EMITTING DIODES", filed on Dec. 31, 2010, which claims priority to Chinese patent application No. 201010257482.0 titled "OPEN-CIRCUIT PROTECTION CIRCUIT OF CONSTANT CURRENT DRIVING CIRCUIT FOR LIGHT EMITTING DIODES" and filed with State Intellectual Property Office of PRC on Aug. 16, 2010, which are incorporated herein by reference in their entirety

FIELD OF THE INVENTION

The invention relates to constant current driving circuit, and particularly to an open-circuit protection circuit of a constant current driving circuit for light emitting diodes.

BACKGROUND OF THE INVENTION

In a constant current driving circuit for light emitting diodes (LED) with multiple outputs, each load branch includes one or more LEDs. When the voltages of two load branches are not the same, it is needed to balance the current of the two load branches, i.e. it is needed to realize that the total current output by the constant current driving circuit is assigned to each of the LED load branches as required.

Reference is made to FIG. 1 which is a circuit diagram of a conventional constant current driving circuit for light emitting diodes. A transformer Ta10 includes a secondary winding WT10 which is connected to two rectification loops to supply power to two load branches A1 and A2. In this circuit, the balance between the two load branches A1 and A2 is achieved by a current sharing transformer T10. If there are more than two loads, for example N load branches, N−1 current sharing transformers are needed. This circuit has the following disadvantage: in the case that one load branch connected to the current sharing transformer T10 is open circuited, to ensure normal operation of the other load branch connected to the current sharing transformer T10, there may be an over voltage occurred in the open circuited load, leading to damage of the circuit.

Reference is made to FIG. 2 which is a circuit diagram of an open-circuit protection circuit of a constant current driving circuit for light emitting diodes in the prior art. On the basis of the circuit shown in FIG. 1, in the circuit shown in FIG. 2, each of the loads in the constant current driving circuit for light emitting diodes is connected in parallel with an open-circuit protection circuit at the output of the load. The open-circuit protection circuit includes a zener diode ZD10, a first resistor R10, a second resistor R20, a first filter capacitor Cp10 and a thyristor SCR10. The zener diode ZD10, the first resistor R10 and the second resistor R20 are connected in series with each other and then connected in parallel with the load. The first filter capacitor Cp10 is connected in parallel with the second resistor R20. The thyristor SCR10 is connected in parallel with the load, and the gate electrode of the thyristor SCR10 is connected to the first resistor R10 at a terminal which is connected to the second resistor R20. When a load is open circuited or there is an over voltage, the zener diode ZD10 is in reverse conduction if the output voltage of the load branch is not less than the clamping voltage of the zener diode ZD10. After the current limiting by the first resistor R10 and the filtering by the first filter capacitor Cp10 and the second resistor R20, the thyristor SCR10 will obtain a gate electrode current. If this gate electrode current is not less than the threshold of the thyristor SCR10, the thyristor SCR10 is turned on and the load current flows through the thyristor SCR10, so that the voltage is decreased, thereby the LEDs in the other load branchs operate properly.

However, the above mentioned open-circuit protection circuit in the prior art has the following disadvantage: as shown in FIG. 2, when the thyristor SCR10 is turned on, the output capacitor Co10 or Co20 are shorted. Devices including SCR10 withstand larger current stresses because of the discharge of the output capacitor Co10 or Co20. Therefore devices which can withstand larger current are needed, so that the cost is increased. Taking two load branches as an example, in the case that the thyristor SCR10 in one load branch is turned on, the current sharing winding of the current sharing transformer T10 bears ½ of the output voltage. Since the current sharing transformer T10 bears a larger voltage, it is necessary to use a current sharing transformer with larger bulky.

SUMMARY OF THE INVENTION

The object of the invention is to provide an open-circuit protection circuit of a constant current driving circuit for light emitting diodes, whereby the cost and the bulk of the current sharing transformer can be reduced.

In order to achieve the above mentioned object, the invention provides the following solution: an open-circuit protection circuit of a constant current driving circuit for light emitting diodes, including a transformer which includes at least one secondary winding connected to at least two load branches, each of the load branches having a same structure;

wherein each of the load branches and the secondary winding form a rectification loop and the secondary winding has a tap end which divides the secondary winding into two secondary sub-windings;

the circuit further includes a current sharing transformer provided in the adjacent two load branches; and each of the load branches is respectively connected to an open-circuit protection module which includes a detection control unit and a processing unit, wherein the detection control unit is configured to output a control signal to the processing unit when the detection control unit detects that an output voltage of the load branch or a voltage proportional to the output voltage is not less than a corresponding preset threshold; and the processing unit is configured to short the secondary sub-winding in the corresponding load branch and a current sharing winding of the current sharing transformer connected in series with the secondary sub-winding once the control signal is received.

Preferably, in each of the load branches, a dotted end of the secondary winding is connected to an anode of a first diode, and a cathode of the first diode is connected to an non-dotted end of the secondary winding via a first output capacitor;

one terminal of the first output capacitor which is connected to the cathode of the first diode serves as a positive output terminal of the load branch, and the other terminal of the first output capacitor serves as a negative output terminal of the load branch; and between the non-dotted end of the secondary winding and the negative output terminal of the load branch including the secondary winding, there is connected in series a winding of the current sharing transformer provided in the load branch and the adjacent load branch.

Preferably, the processing unit includes a second diode, a first capacitor and a switching device, wherein an anode of the second diode is connected to the tap end of the secondary winding, and a cathode of the second diode is connected to a first terminal of the switching device; a second terminal of the switching device is connected to the negative output terminal of the load branch, and a control terminal of the switching device is connected to a control signal output terminal of the detection control unit; and the first capacitor is connected in parallel with the switching device between the first and second terminals of the switching device.

Preferably, the detection control unit includes a zener diode, a first resistor, a second resistor and a first filter capacitor;

the switching device serves as a thyristor, an anode of the thyristor is the first terminal of the switching device, and a cathode of the thyristor is the second terminal of the switching device; and a cathode of the zener diode is connected to the positive output terminal of the load branch, an anode of the zener diode is connected to the negative output terminal of the load branch via the first resistor and the second resistor, and the first filter capacitor is connected in parallel with the second resistor.

Preferably, in each of the load branches, a dotted end of the secondary winding is connected to an anode of a first diode via a first output capacitor, and a cathode of the first diode is connected to an non-dotted end of the secondary winding;

one terminal of the first output capacitor which is connected to the dotted end of the secondary winding serves as a positive output terminal of the load branch, and the other terminal of the first output capacitor which is connected to the anode of the first diode serves as a negative output terminal of the load branch; and a winding of the current sharing transformer provided in the load branch and the adjacent load branch is connected in series between the non-dotted end of the secondary winding and the negative output terminal of the load branch comprising the secondary winding.

Preferably, the processing unit includes a second diode, a first capacitor and a switching device, wherein a first terminal of the switching device is connected to the positive output terminal of the load branch, a second terminal of the switching device is connected to an anode of the second diode, and a cathode of the second diode is connected to the tap end of the secondary winding; and a control terminal of the switching device is connected to a control signal output terminal of the detection control unit; and the first capacitor is connected in parallel with the switching device between the first and second terminals of the switching device.

Preferably, a primary side of the transformer includes a primary winding and a switch; the transformer and the switch form a flyback topology circuit; and a dotted end of the primary winding of the transformer is connected to one terminal of the switch, the other terminal of the switch is connected to a negative terminal of a power supply, and an non-dotted end of the primary winding of the transformer is connected to a positive terminal of the power supply.

The invention further provides an open-circuit protection circuit of a constant current driving circuit for light emitting diodes, including a transformer which includes at least one secondary winding connected to at least two load branches, each of the load branches having a same structure;

wherein each of the load branches and the secondary winding form the rectification loop, and the secondary winding has a tap end which divides the secondary winding into two secondary sub-windings;

the circuit further includes a current sharing transformer connected in series in each of the load branches, wherein a primary current sharing winding of each current sharing transformer is respectively connected to one secondary sub-winding of a secondary winding corresponding to each of the load branches, and secondary current sharing windings of the current sharing transformers are connected in series sequentially; and each of the load branches is connected to an open-circuit protection module which includes a detection control unit and a processing unit, wherein the detection control unit is configured to output a control signal to the processing unit when the detection control unit detects that an output voltage of the load branch or a voltage proportional to the output voltage is not less than a corresponding preset threshold; and the processing unit is configured to perform shorting between the tab end of the secondary winding and one terminal of the primary current sharing winding of the current sharing transformer which is not connected to the secondary winding once the control signal is received.

Preferably, in each of the load branches, a dotted end of the secondary winding is connected to an anode of a first diode, and a cathode of the first diode is connected to an non-dotted end of the secondary winding via a first output capacitor;

one terminal of the first output capacitor which is connected to the cathode of the first diode serves as a positive output terminal of the load branch, and the other terminal of the first output capacitor serves as a negative output terminal of the load branch; and the primary current sharing winding of the current sharing transformer is connected in series between the non-dotted end of the secondary winding and the negative output terminal of the load branch including the secondary winding.

Preferably, the processing unit includes a second diode, a first capacitor and a switching device, wherein an anode of the second diode is connected to the tap end of the secondary winding, and a cathode of the second diode is connected to a first terminal of the switching device; a second terminal of the switching device is connected to the negative output terminal of the load branch, and a control terminal of the switching device is connected to a control signal output terminal of the detection control unit; and the first capacitor is connected in parallel with the switching device between the first and second terminals of the switching device.

Preferably, the detection control unit includes a zener diode, a first resistor, a second resistor and a first filter capacitor;

the switching device serves as a thyristor, an anode of the thyristor is the first terminal of the switching device, and a cathode of the thyristor is the second terminal of the switching device; and a cathode of the zener diode is connected to the positive output terminal of the load branch, an anode of the zener diode is connected to the negative output terminal of the load branch via the first resistor and the second resistor, and the first filter capacitor is connected in parallel with the second resistor.

Preferably, in each of the load branches, a dotted end of the secondary winding is connected to an anode of a first diode via a first output capacitor, and a cathode of the first diode is connected to an non-dotted end of the secondary winding;

one terminal of the first output capacitor which is connected to the dotted end of the secondary winding serves as a positive output terminal of the load branch, and the other terminal of the first output capacitor which is connected to the anode of the first diode serves as a negative output terminal of the load branch; and the current sharing winding of the current sharing transformer is connected in series between the dotted end of the secondary winding and the positive output terminal of the load branch including the secondary winding.

Preferably, the processing unit includes a second diode, a first capacitor and a switching device, wherein a first terminal of the switching device is connected to the positive output terminal of the load branch, a second terminal of the switching device is connected to an anode of the second diode, and a cathode of the second diode is connected to the tap end of the secondary winding; and a control terminal of the switching device is connected to a control signal output terminal of the detection control unit; and the first capacitor is connected in parallel with the switching device between the first and second terminals of the switching device.

Preferably, a primary side of the transformer includes a primary winding and a switch; the transformer and the switch form a flyback topology circuit; and a dotted end of the primary winding of the transformer is connected to one terminal of the switch, the other terminal of the switch is connected to a negative terminal of a power supply, and an non-dotted end of the primary winding of the transformer is connected to a positive terminal of the power supply.

According to the specific embodiments provided by the invention, the invention discloses the following technical effects.

In the embodiments of the invention, the secondary winding included in the constant current driving circuit for light emitting diodes has a tap end which divides the secondary winding into two secondary sub-windings; each of the current sharing windings of the current sharing transformers connected in series in two adjacent load branches is connected to one secondary sub-winding of the secondary winding corresponding to each of the load branches. Each of the load branches is respectively connected to an open-circuit protection module which includes a detection control unit and a processing unit, wherein the detection control unit is configured to output a control signal to the processing unit when the detection control unit detects that an output voltage of the load branch or a voltage proportional to the output voltage is not less than a corresponding preset threshold; and the processing unit is configured to perform shorting between the tap end of the secondary winding and one terminal of the current sharing winding of the current sharing transformer which is not connected to the secondary winding once the control signal is received.

The detection control unit outputs a control signal to the processing unit when the load is open circuited and the detection control unit detects that an output voltage of the load branch or a voltage proportional to the output voltage is not less than a corresponding preset threshold. The processing unit performs the shorting between the tap end of the secondary winding and one terminal of the current sharing winding of the current sharing transformer which is not connected to the secondary winding. The output capacitor is not directly shorted and the impulse current suffered by the processing unit is small, thereby the current stresses on the related components in the processing unit are reduced. Accordingly, in the present embodiment, components withstood smaller current stresses can be used, so that the cost for the open-circuit protection is reduced.

Moreover, when a load is open circuited, the open-circuit protection module included in the load only performs the shorting between the tap end of the secondary winding and one terminal of the current sharing winding of the current sharing transformer which is not connected to the secondary winding. Therefore, when the processing unit of the open-circuit protection module performs the shorting, the winding of the current sharing transformer bears a smaller voltage, so that the bulk of the current sharing transformer can be reduced.

BRIEF DESCRIPTION OF THE DRAWINGS

Technical solutions of the embodiments of the present applicant and/or the prior art will be illustrated more clearly with the following brief description of the drawings. Apparently, the drawings referred in the following description constitute only some embodiments of the invention. Those skilled in the art may obtain some other drawings from these drawings without any creative work.

DETAILED DESCRIPTION OF THE INVENTION

The technical solution according to the embodiments of the present invention will be described clearly and completely as follows in conjunction with the accompanying drawings. It is obvious that the described embodiments are only a part of the embodiments according to the present invention. Any of other embodiments obtained by those skilled in the art based on the embodiments in the present invention without any creative work falls in the scope of the present invention.

The object of the invention is to provide an open-circuit protection circuit of a constant current driving circuit for light emitting diodes, whereby the cost and the bulk of the current sharing transformer can be reduced.

To make the above object, features and advantages of the invention clearer and easy to be understood, in the following, the invention will be illustrated further in detail in conjunction with the drawings and particular embodiments.

Figure 1:
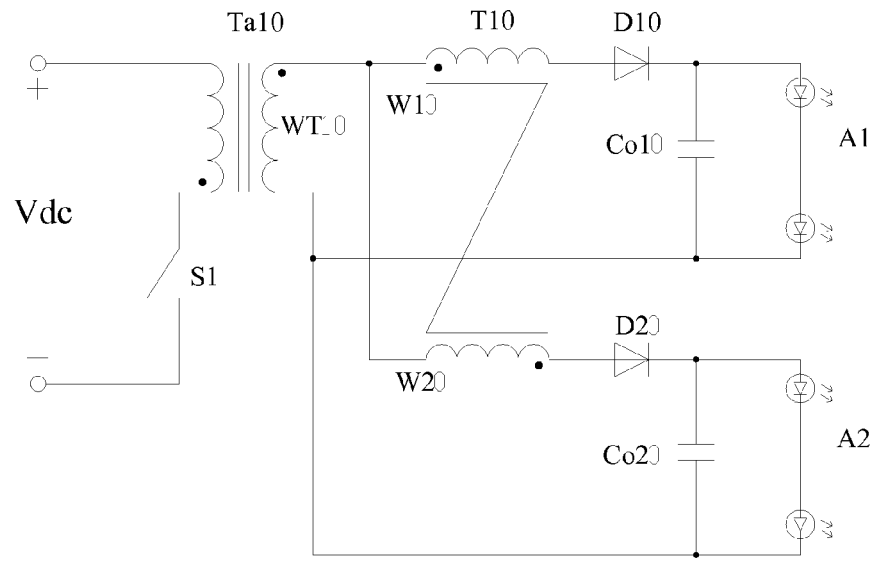
FIG. 1 is a circuit diagram of a conventional constant current driving circuit for light emitting diodes.
Figure 2:
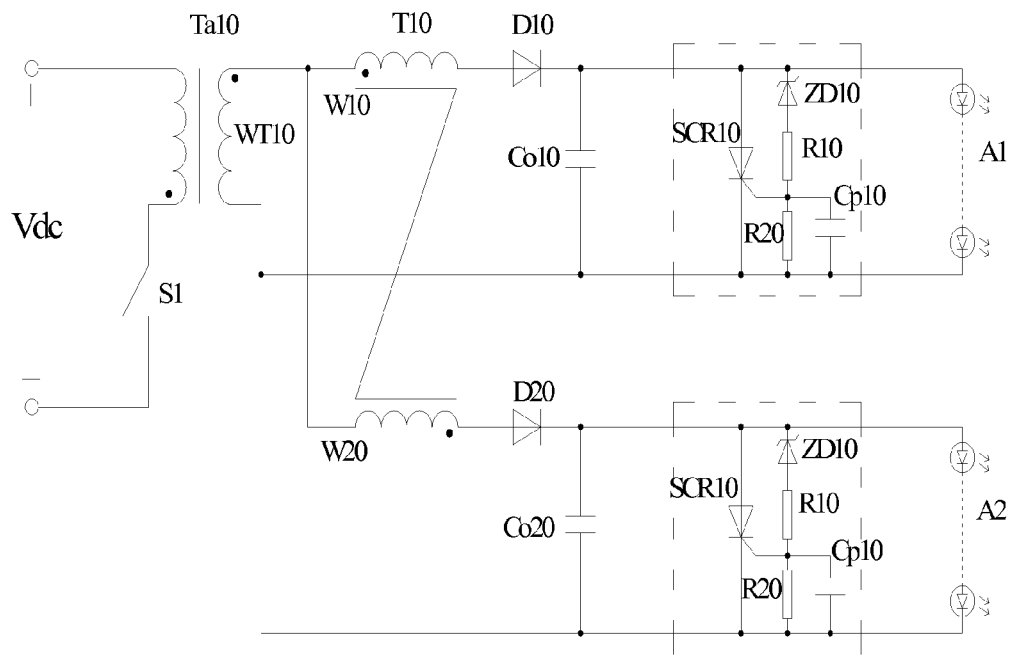
FIG. 2 is a circuit diagram of an open-circuit protection circuit of a constant current driving circuit for light emitting diodes in the prior art.
Figure 3:
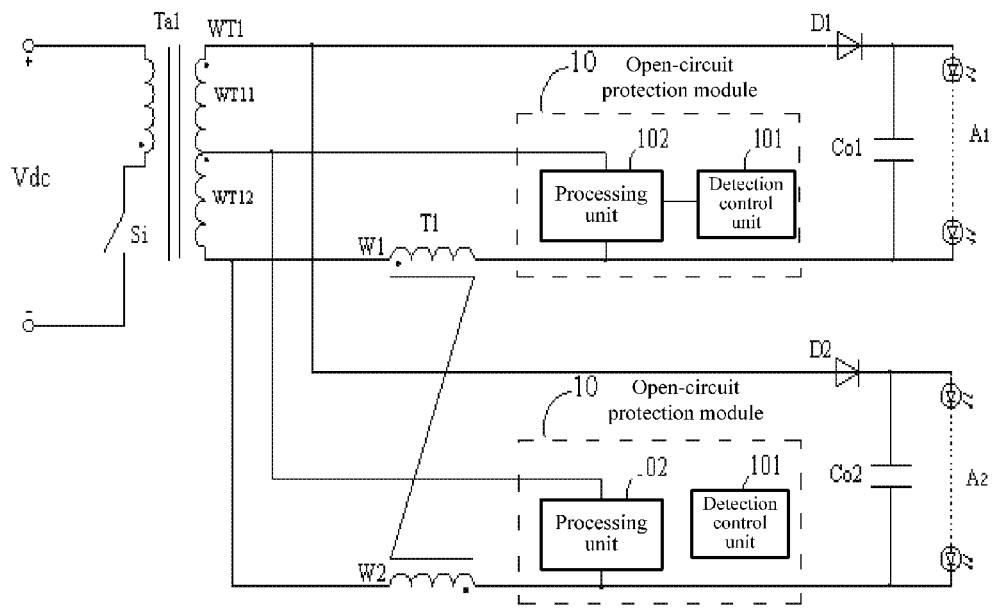
FIG. 3 is a circuit diagram of an open-circuit protection circuit of a constant current driving circuit for light emitting diodes according to a first embodiment of the invention.

Reference is made to FIG. 3 which is a circuit diagram of an open-circuit protection circuit of a constant current driving circuit for light emitting diodes according to a first embodiment of the invention.

As shown in FIG. 3, the circuit includes a transformer Ta1.

A primary side of the transformer Ta1 includes a primary winding and a switch Si. The transformer and the switch Si form a flyback topology circuit. A dotted end of the primary winding of the transformer Ta1 is connected to one terminal of the switch Si, the other terminal of the switch Si is connected to a negative terminal of a power supply Vdc, and an non-dotted end of the primary winding of the transformer Ta1 is connected to a positive terminal of the power supply Vdc.

A secondary side of the transformer Ta1 includes a first secondary winding WT1 which has two load branches connected with a load A1 and a load A2 respectively. Each of the load branches has a same structure.

Each of the load branches and the first secondary windings WT1 form a rectification loop.

In the rectification loop formed by the first load branch, a dotted end of the first secondary winding WT1 is connected to an anode of a first diode D1, and a cathode of the first diode D1 is connected to an non-dotted end of the first secondary winding WT1 via a first output capacitor Co1; and in the rectification loop formed by the second load branch, a dotted end of the first secondary winding WT1 is connected to an anode of a first diode D2, and a cathode of the first diode D2 is connected to an non-dotted end of the first secondary winding WT1 via a first output capacitor Co2.

The first output capacitors Co1 and Co2 form the output terminals of the first load branch and the second load branch respectively. The illustration is made by taking the first load branch as an example. One terminal of the first output capacitor Co1 which is connected to the cathode of the first diode D1 is a positive output terminal of the first load branch, and the other terminal of the first output capacitor Co1 is a negative output terminal of the first load branch. The load A1 is connected in parallel with the first output capacitor Co1.

As shown in FIG. 3, in order to balance the current of the multiple loads of the constant current driving circuit, the secondary side of the transformer Ta1 further includes a first current sharing transformer T1. The first current sharing transformer T1 includes a first current sharing winding W1 and a second current sharing winding W2 which are connected in series in the first load branch and the second load branch respectively.

According to the first embodiment of the invention, for each of the load branches, each of the current sharing windings of the first current sharing transformer T1 is connected in series between the non-dotted end of the first secondary winding WT1 and the negative output terminal of respective one of the load branches. Specifically:

for the first load branch, the dotted end of the first current sharing winding W1 is connected to the non-dotted end of the first secondary winding WT1, and the non-dotted end of the first current sharing winding W1 is connected to the negative output terminal of the first load branch, and for the second load branch, the non-dotted end of the second current sharing winding W2 is connected to the non-dotted end of the first secondary winding WT1, and the dotted end of the second current sharing winding W2 is connected to the negative output terminal of the second load branch.

According to the embodiment of the invention, the first secondary winding WT1 has a tap end. As shown in FIG. 3, the tap end divides the first secondary winding WT1 into a first secondary sub-winding WT11 and a second secondary sub-winding WT12. The non-dotted end of the first secondary sub-winding WT11 is the dotted end of the second secondary sub-winding WT12; the common end of the first secondary sub-winding WT11 and the second secondary sub-winding WT12 is the tap end of the first secondary winding WT1.

As shown in FIG. 3, an open-circuit protection module 10 is provided for each of the load branches. The open-circuit protection module 10 is connected between the tap end of the first secondary winding WT1 and the negative output terminal of respective one of the load branches.

An illustration is made by taking the first load branch as an example. The open-circuit protection module 10 is connected in parallel between the tap end of the first secondary winding WT1 and the negative output terminal of the first load branch. The open-circuit protection module 10 includes a detection control unit 101 and a processing unit 102.

The detection control unit 101 is adapted to detect an output voltage of the first load branch or a voltage proportional to the output voltage. When the output voltage of the first load branch or the voltage proportional to the output voltage is not less than the corresponding preset threshold, the detection control unit 101 outputs a control signal to the processing unit 102.

The processing unit 102 is connected in parallel between the tap end of the first secondary winding WT1 and the negative output terminal (i.e. a terminal of the first current sharing winding W1 of the first current sharing transformer T1 which is not connected to the first secondary winding WT1) of the first load branch. That is to say, as shown in FIG. 3, the processing unit 102 is connected in parallel with a path formed by the second secondary sub-winding WT12 and the first current sharing winding W1. The processing unit 102 is adapted to short the second secondary sub-winding WT12 and the first current sharing winding W1 when the processing unit 102 receives the control signal.

Similarly, for the second load branch, the open-circuit protection module 10 is connected in parallel between the tap end of the first secondary winding WT1 and the negative output terminal of the second load branch. The open-circuit protection module 10 includes a detection control unit 101 and a processing unit 102.

The detection control unit 101 is adapted to detect an output voltage of the second load branch or a voltage proportional to the output voltage. When the output voltage of the second load branch or the voltage proportional to the output voltage is not less than the corresponding preset threshold, the detection control unit 101 outputs a control signal to the processing unit 102.

The processing unit 102 is connected in parallel between the tap end of the first secondary winding WT1 and the negative output terminal (i.e. a terminal of the second current sharing winding W2 of the first current sharing transformer T1 which is not connected to the first secondary winding WT1) of the second load branch. That is to say, as shown in FIG. 3, the processing unit 102 is connected in parallel with a path formed by the second secondary sub-winding WT12 and the second current sharing winding W2. The processing unit 102 is adapted to short the second secondary sub-winding WT12 and the second current sharing winding W2 when the processing unit 102 receives the control signal.

In this embodiment, taking the first load branch for example, if the load A1 is open circuited, the detection control unit 101 detects that the output voltage of the first load branch or the voltage proportional to the output voltage is not less than the corresponding preset threshold and outputs a control signal to the processing unit 102, so that the processing unit 102 shorts the second secondary sub-winding WT12 and the current sharing winding W1 of the first current sharing transformer T1. The circuit according to the present embodiment does not directly short the first output capacitor Co1, so that the processing unit 102 bears a smaller impulse current, thereby the current stresses on the related components in the processing unit 102 are reduced. Accordingly, in the present embodiment, components withstood smaller current stresses can be used for the processing unit 102, so that the cost for the open-circuit protection is reduced.

Moreover, in this embodiment, when a load branch is open circuited, the open-circuit protection module connected in parallel in the load branch only shorts a secondary sub-winding of the secondary winding and the current sharing winding of the current sharing transformer which is connected in series with the secondary sub-winding. Therefore, when the processing unit of the open-circuit protection module performs the shorting, the current sharing winding of the current sharing transformer connected in series in the load branch bears a voltage smaller than ½ of the voltage output by the load branch, so that the bulk of the current sharing transformer can be reduced.

Figure 4:
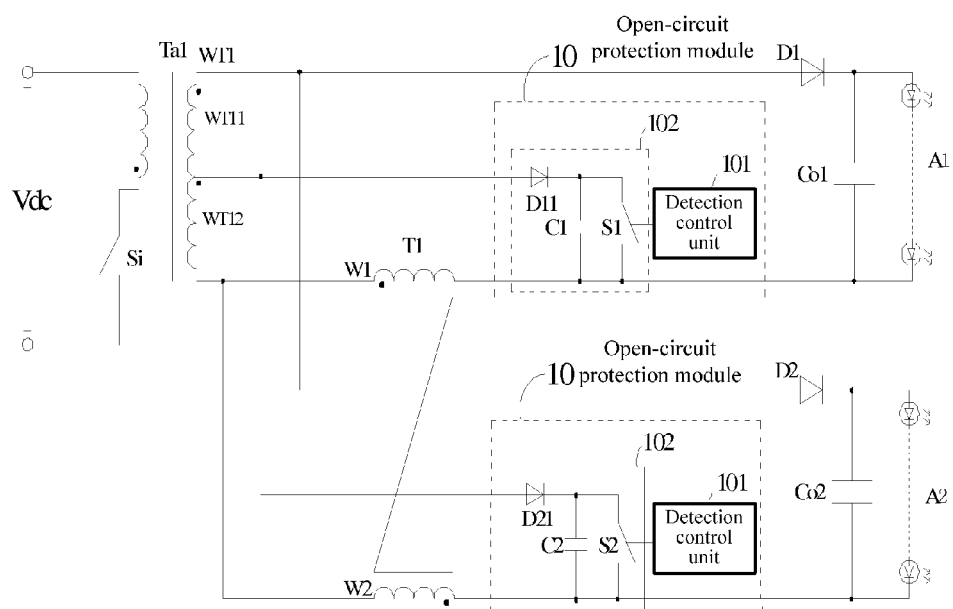
FIG. 4 is a circuit diagram of an open-circuit protection circuit of a constant current driving circuit for light emitting diodes according to a second embodiment of the invention.

Reference is made to FIG. 4 which is a circuit diagram of an open-circuit protection circuit of a constant current driving circuit for light emitting diodes according to a second embodiment of the invention. FIG. 4 shows an implementation of the processing unit in the circuit shown in FIG. 3. Of course, in other embodiments of the invention, the processing unit can also be implemented in other ways.

The illustration is made by taking the first load branch as an example. As shown in FIG. 4, the processing unit 102 may include a second diode D11, a first capacitor C1 and a switching device S1. An anode of the second diode D11 is connected to the tap end of the first secondary winding WT1, and a cathode of the second diode D11 is connected to a first terminal of the switching device S1; a second terminal of the switching device S1 is connected to the negative output terminal of the first load branch, and a control terminal of the switching device S1 is connected to a control signal output terminal of the detection control unit 101; and the first capacitor C1 is connected in parallel with the switching device S1 between the first and second terminals of the switching device S1. The first capacitor C1 is used for filtering.

When the detection control unit 101 detects that the load in the load branch operates normally, the switching device S1 in the control processing unit 102 is open circuited or in a high impedance state; when the detection control unit 101 detects that the load is open circuited or has an over voltage (specifically, the output voltage of the load branch or the voltage proportional to the output voltage is not less than the corresponding preset threshold), the switching device S1 in the processing unit 102 is controlled to be on state or in a low impedance state, so that the branch which has the first secondary sub-winding WT11 of the transformer Ta1 and the current sharing winding of the current sharing transformer T1 is in a low impedance state.

In the embodiment of the invention, the detection control unit 101 can be adapted to detect the output voltage of each of the load branches and can also be adapted to detect the voltage proportional to the output voltage of each of the load branches, which will be described respectively as follows.

Figure 5:
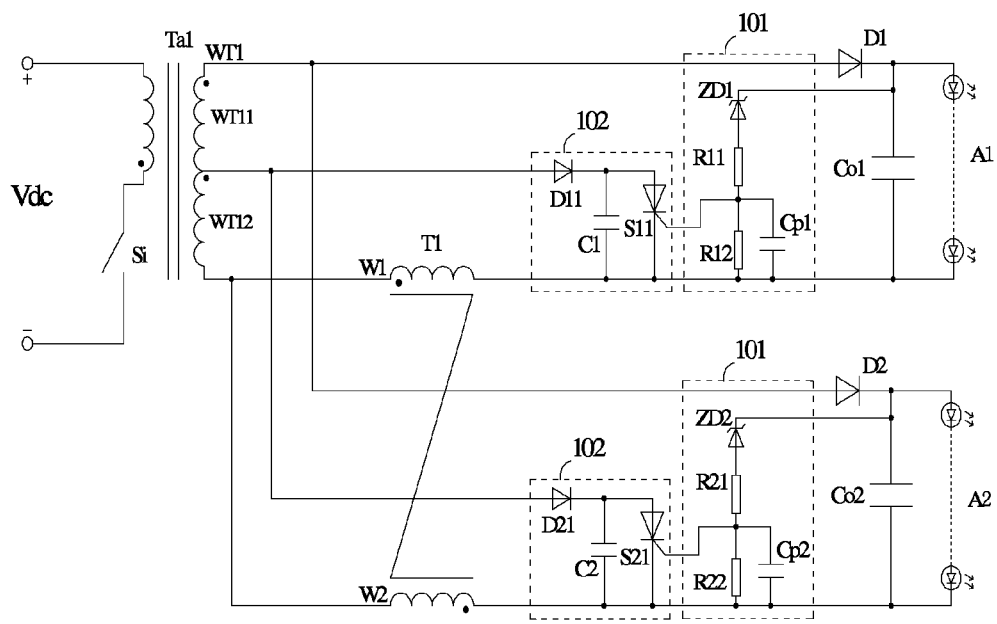
FIG. 5 is a circuit diagram of an open-circuit protection circuit of a constant current driving circuit for light emitting diodes according to a third embodiment of the invention.

Reference is made to FIG. 5 which is a circuit diagram of an open-circuit protection circuit of a constant current driving circuit for light emitting diodes according to a third embodiment of the invention. FIG. 5 shows an implement of the detection control unit of the open-circuit protection circuit shown in FIG. 4. In FIG. 5, the detection control unit 101 detects the output voltage of each of the load branches. Of course, in other embodiments of the invention, the detection control unit can also be implemented in other ways.

In the open-circuit protection circuit shown in FIG. 5, the illustration is made also by taking the first load branch as an example. For the open-circuit protection module 10, the detection control unit 101 includes: a zener diode ZD1, a first resistor R11, a second resistor R12, a first filter capacitor Cp1; and the difference of the processing unit 102 from that shown in FIG. 3 is that the switching device S1 is a thyristor S11.

It should be noted that in the third embodiment of the invention the detection control circuit 101 is adapted to detect whether the output voltage of each of the load branches exceeds a preset threshold. Therefore, correspondingly, the detection control circuit 101 is connected between the positive output terminal and the negative output terminal of respective one of the load branches.

Specifically, the cathode of the zener diode ZD1 is connected to the positive output terminal of the first load branch, and the anode of the zener diode ZD1 is connected to the negative output terminal of the first load branch via the first resistor R11 and second resistor R12, and the first filter capacitor Cp1 is connected in parallel with the second resistor R12.

The gate electrode of the thyristor S11 is a control terminal of the processing unit 102 and is connected to a common end of the first resistor R11 and the second resistor R12. The anode of the thyristor S11 is connected to the cathode of the second diode D11. The anode of the second diode D11 is connected to the tap end of the first secondary winding WT1. The cathode of the thyristor S11 is connected to the negative output terminal of the first load branch. The first capacitor C1 is connected in parallel with the switching device (namely, the thyristor S11) between the first and second terminals of the switching device.

In the present embodiment, taking the first load branch for example, if the load A1 is open circuited and the output voltage of the first load branch is not less than the clamping voltage of the zener diodes ZD1, the zener diode ZD1 is turned on. When the zener diode ZD1 is turned on, following the current limiting by the first resistor R11 and the filtering by the second resistor R12 and the first filter capacitor Cp1, a control current is output to the gate electrode of the thyristor S11. If the control current is not less than the threshold of the thyristor S11, the thyristor S11 is turned on, so as to short the branch including the second secondary sub-winding WT12 and the first current sharing winding W1. The circuit does not directly short the first output capacitor Co1, so that the processing unit 102 bears a smaller impulse current, thereby the current stress on the thyristor S11 is reduced. Accordingly, in the present embodiment, a thyristor withstood a smaller current stress can be used for the processing unit 102, so that the cost for the open-circuit protection is reduced.

Moreover, in this embodiment, when a load branch is open circuited, the open-circuit protection module included in the load branch only shorts a secondary sub-winding of the secondary winding and the current sharing winding of the current sharing transformer which is connected in series with the secondary sub-winding. Therefore, when the processing unit of the open-circuit protection module performs the shorting, the current sharing winding of the current sharing transformer bears a voltage smaller than ½ of the voltage output by the whole load branch, so that the bulk of the current sharing transformer can be reduced.

In the third embodiment of the invention, the voltage detected by the detection control unit is the output voltage of the load branch and it is determined whether the output voltage of the load branch is normal depending directly on the output voltage. In practical applications, the detection control unit can also determine whether the output voltage is normal depending indirectly on any voltage detected in the load branch that is proportional to the output voltage, so as to determine whether to perform the open-circuit protection on the load branch.

Figure 6:
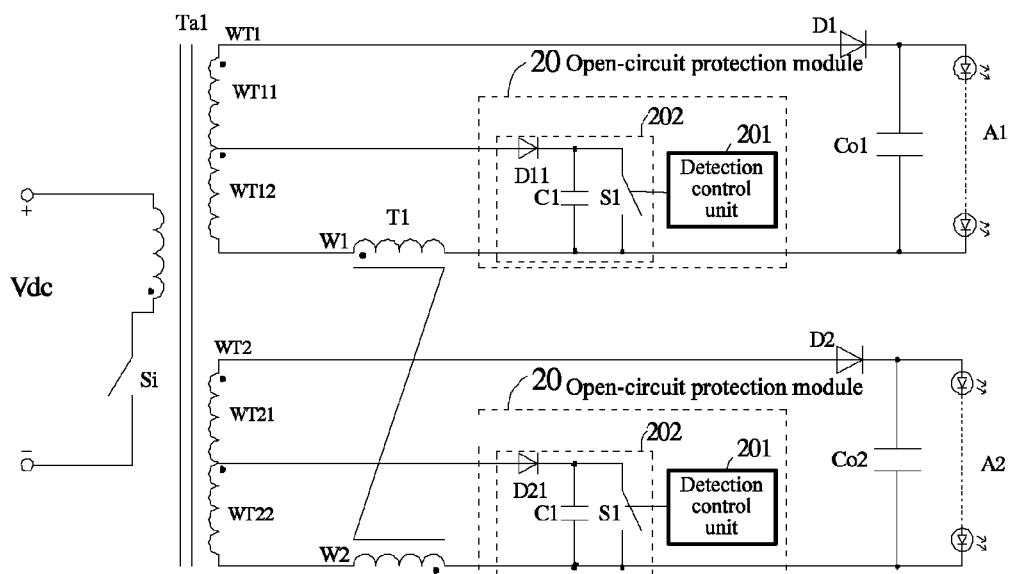
FIG. 6 is a circuit diagram of an open-circuit protection circuit of a constant current driving circuit for light emitting diodes according to a fourth embodiment of the invention.

In the first to third embodiments of the invention, the secondary side of the transformer Ta1 includes only one winding. In the practical application, the secondary side of the transformer Ta1 may also include multiple secondary windings. In this case, the open-circuit protection modules according to the embodiments of the invention are still applicable. Reference is made to FIG. 6 which is a circuit diagram of an open-circuit protection circuit of a constant current driving circuit for light emitting diodes according to a fourth embodiment of the invention. In the fourth embodiment of the invention, the illustration is made by taking the transformer Ta1 having two secondary windings as an example.

The open-circuit protection circuit of the constant current driving circuit according to the fourth embodiment shown in FIG. 6 is different from the circuit according to the first embodiment shown in FIG. 3 in that the transformer Ta1 includes two secondary windings, i.e. a first secondary winding WT1 and a second secondary winding WT2; the circuit includes two load branches, in which a first load branch is connected to the first secondary winding WT1 and a second load branch is connected to the second secondary winding WT2. The connection between each of the load branches and each of the secondary windings is the same as that of the first embodiment.

As shown in FIG. 6, each of the current sharing windings of the first current sharing transformer T1 is connected in series between the non-dotted end of each of the secondary windings and the negative output terminal of respective one of the load branches. Specifically, for the first load branch, the dotted end of the first current sharing winding W1 is connected to the non-dotted end of the first secondary winding WT1, and the non-dotted end of the first current sharing winding W1 is connected to the negative output terminal of the first load branch, and for the second load branch, the non-dotted end of the second current sharing winding W2 is connected to the non-dotted end of the second secondary winding WT2, and the dotted end of the second current sharing winding W2 is connected to the negative output terminal of the second load branch.

According to the embodiment of the invention, both the first secondary winding WT1 and the second secondary winding WT2 have a tap end. As shown in FIG. 6, the tap end of the first secondary winding WT1 divides the first secondary winding WT1 into a first secondary sub-winding WT11 and a second secondary sub-winding WT12; and the tap end of the second secondary winding WT2 divides the second secondary winding WT2 into a first secondary sub-winding WT21 and a second secondary sub-winding WT22.

As shown in FIG. 6, an open-circuit protection module 20 is provided for each of the load branches. Each of the open-circuit protection modules 20 is connected between the tap end of each of the secondary windings and the negative output terminal of the load branch including the secondary winding. The open-circuit protection module 20 includes a detection control unit 201 and a processing unit 202.

The detection control unit 201 is adapted to output a control signal to the processing unit 202 when the detection control unit 201 detects that the output voltage of each of the load branches or the voltage proportional to the output voltage is not less than a corresponding preset threshold.

The processing unit 202 is adapted to short one secondary sub-winding of the secondary winding and the current sharing winding of the current sharing transformer connected in series with the secondary sub-winding when the processing unit 202 receives the control signal.

In practical applications, in the case that the secondary side of the transformer Ta1 includes multiple secondary windings, if each of the current sharing windings of the current sharing transformer is connected in series between the non-dotted end of each of the secondary windings and the negative output terminal of the load branch corresponding to the secondary winding, the open-circuit protection modules according to the above mentioned embodiments are still applicable.

Figure 7:
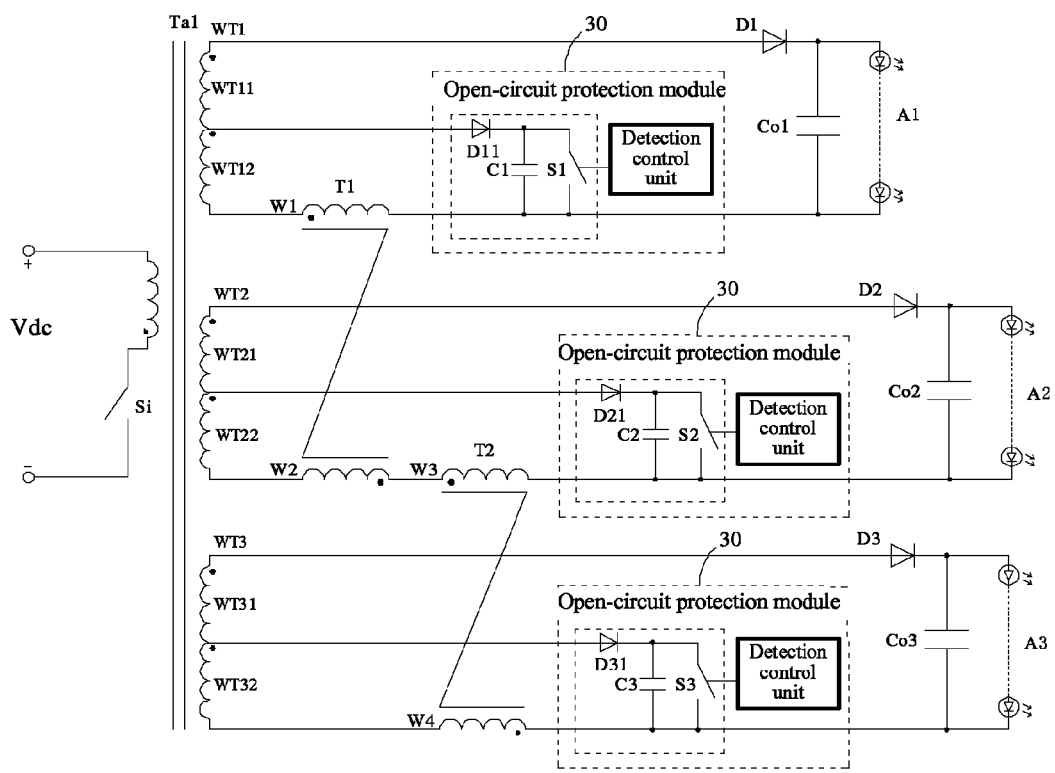
FIG. 7 is a circuit diagram of an open-circuit protection circuit of a constant current driving circuit for light emitting diodes according to a fifth embodiment of the invention.

Reference is made to FIG. 7 which is a circuit diagram of an open-circuit protection circuit of a constant current driving circuit for light emitting diodes according to a fifth embodiment of the invention. The open-circuit protection circuit of the constant current driving circuit for light emitting diodes according to the fifth embodiment is different from the circuit according to the fourth embodiment shown in FIG. 6 in that the circuit includes three secondary windings WT1 to WT3, in which each of the secondary windings is connected to a respective load branch.

In this case, the circuit includes two current sharing transformers T1 and T2 for respectively connecting load branches which include adjacent two secondary windings. As shown in FIG. 7, a first current sharing transformer T1 is connected to a first load branch which includes the first secondary winding WT1 and a second load branch which includes the second secondary winding WT2; a second current sharing transformer T2 is connected to the second load branch which includes the second secondary winding WT2 and a third load branch which includes the third secondary winding WT3; and so on.

Now an illustration is made by taking the representative second load branch as an example.

For the second load branch including the second secondary winding WT2, between the non-dotted end of the second secondary winding WT2 and the negative output terminal of the second load branch including the second secondary winding WT2, there are sequentially connected in series a second current sharing winding W2 of the first current sharing transformer T1 and a first current sharing winding W3 of the second current sharing transformer T2.

The non-dotted end of the second secondary winding WT2 is connected to the non-dotted end of the second current sharing winding W2 of the first current sharing transformer T1; the dotted end of the second current sharing winding W2 of the first current sharing transformer T1 is connected to the dotted end of the first current sharing winding W3 of the second current sharing transformer T2, and the non-dotted end of the first current sharing winding W3 is connected to the negative output terminal of the second load branch.

In this case, an open-circuit protection module 30 is connected for each of the load branches, wherein the connection and the working principle are the same as those described in the above mentioned embodiments and are not described in detail herein.

It should be noted that, in the case that there are multiple load branches, it is possible that windings of two different current sharing transformers are connected in series in one load branch, and there are two windings of the current sharing transformers connected in series with the secondary sub-winding in the corresponding load branch. Therefore, when the corresponding processing unit receives the control signal, the secondary sub-winding and two current sharing windings connected in series with the secondary sub-winding are shorted.

In other embodiments of the invention, in the case that the secondary side of the transformer Ta1 includes N secondary windings, N−1 current sharing transformers are needed for sequentially connecting the load branches of two adjacent secondary windings. The open-circuit protection circuits according to the embodiments of the invention are also applicable in the case of N secondary windings, which will not be described in detail herein.

Of course, in practical applications, there is also a case that one secondary winding is connected to N load branches. In this case, there are also needed N−1 current sharing transformers for sequentially connecting adjacent two load branches of the secondary winding.

Figure 8:
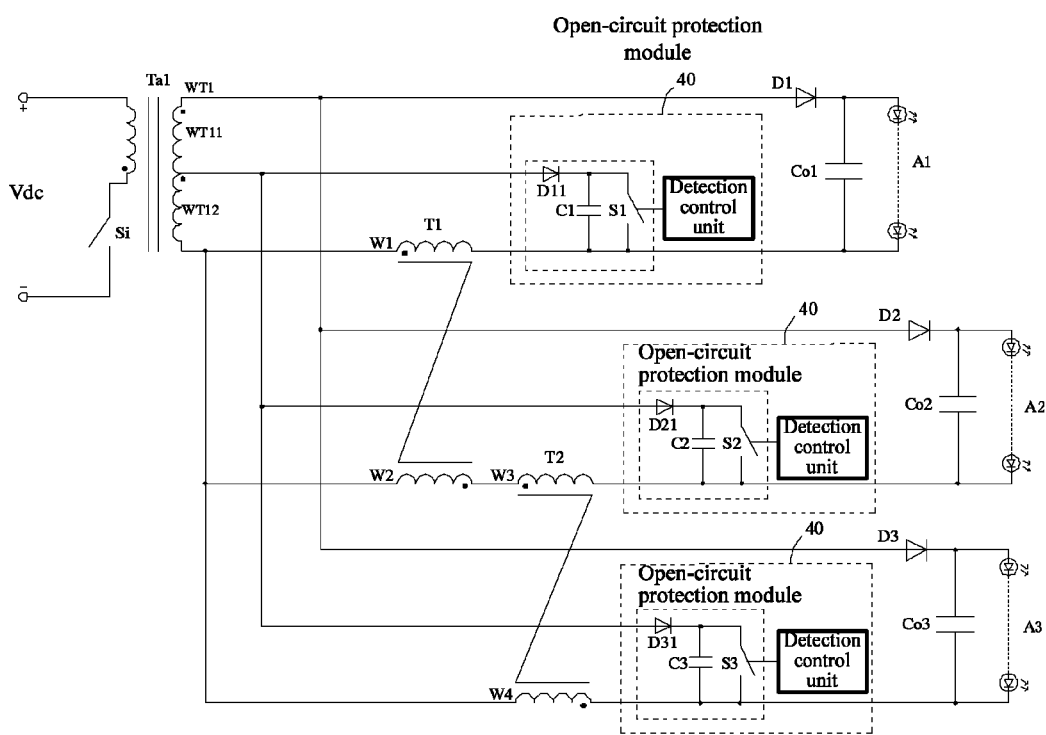
FIG. 8 is a circuit diagram of an open-circuit protection circuit of a constant current driving circuit for light emitting diodes according to a sixth embodiment of the invention.

Reference is made to FIG. 8 which is a circuit diagram of an open-circuit protection circuit of a constant current driving circuit for light emitting diodes according to a sixth embodiment of the invention. In the sixth embodiment of the invention, an illustration is made by taking the first secondary winding WT1 being connected to three load branches as an example.

In this case, the circuit requires two current sharing transformers T1 and T2 for sequentially connecting the adjacent two load branches of the first secondary winding WT1. As shown in FIG. 8, a first current sharing transformer T1 is connected to a first load branch and a second load branch; and a second current sharing transformer T2 is connected to the second load branch and a third load branch.

Now an illustration is made by taking the representative second load branch as an example.

For the second load branch, between the non-dotted end of the first secondary winding WT1 and the negative output terminal of the second load branch, there are sequentially connected in series a second current sharing winding W2 of the first current sharing transformer T1 and a first current sharing winding W3 of the second current sharing transformer T2.

The non-dotted end of the first secondary winding WT1 is connected to the non-dotted end of the second current sharing winding W2 of the first current sharing transformer T1; the dotted end of the second current sharing winding W2 of the first current sharing transformer T1 is connected to the dotted end of the first current sharing winding W3 of the second current sharing transformer T2, and the non-dotted end of the first current sharing winding W3 is connected to the negative output terminal of the second load branch.

In this case, an open-circuit protection module 40 is connected for each of the load branches, wherein the connection and the working principle are the same as those described in the above mentioned embodiments and are not described in detail herein.

In the open-circuit protection circuit according to any of the first to sixth embodiments of the invention, each of the current sharing windings of the current sharing transformers is connected in series between the non-dotted end of the secondary winding and the negative output terminal of respective one of the load branches. In practical applications, the current sharing winding of the current sharing transformer can also be connected between the dotted end of the secondary winding and the positive output terminal of respective one of the load branches.

Figure 9:
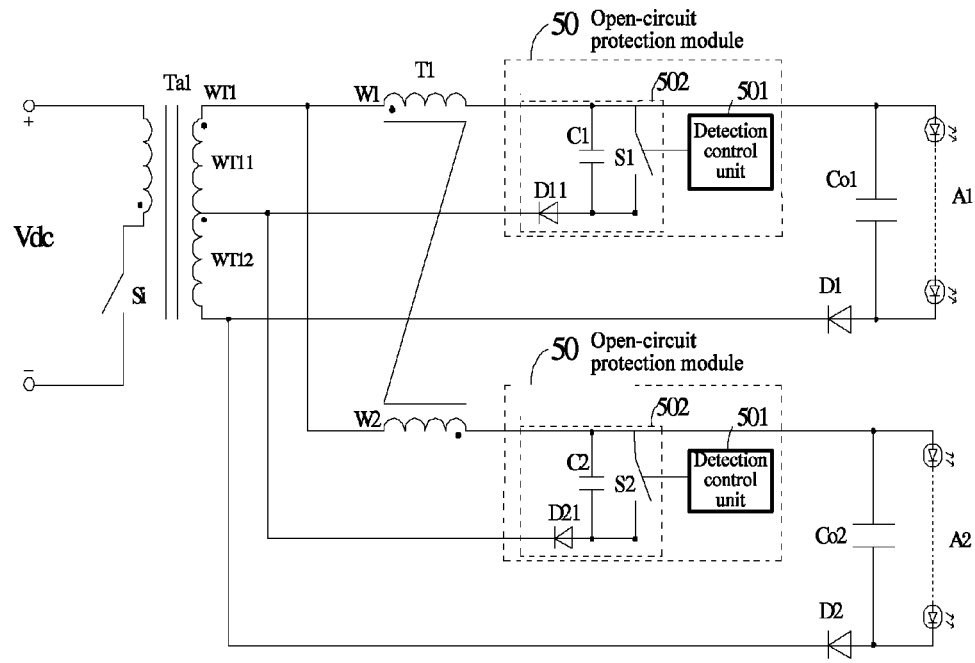
FIG. 9 is a circuit diagram of an open-circuit protection circuit of a constant current driving circuit for light emitting diodes according to a seventh embodiment of the invention.

Reference is made to FIG. 9 which is a circuit diagram of an open-circuit protection circuit of a constant current driving circuit for light emitting diodes according to a seventh embodiment of the invention. The open-circuit protection circuit of the constant current driving circuit shown in FIG. 9 is different from the second embodiment shown in FIG. 4 in that the first current sharing winding W1 and the second current sharing winding W2 of the first current sharing transformer T1 are respectively connected in series between the dotted end of the first secondary winding WT1 and the positive output terminal of respective one of the load branches.

As shown in FIG. 9, a secondary side of the transformer Ta1 includes a first secondary winding WT1 which has two load branches connected with a load A1 and a load A2 respectively. Each of the load branches has a same structure.

in the first load branch, a dotted end of the first secondary winding WT1 is connected to an anode of a first diode D1 via a first output capacitor Co1, and a cathode of the first diode D1 is connected to an non-dotted end of the first secondary winding WT1; and in the second load branch, a dotted end of the first secondary winding WT1 is connected to an anode of a first diode D2 via a first output capacitor Co2, and a cathode of the first diode D2 is connected to an non-dotted end of the first secondary winding WT1.

The first output capacitors Co1 and Co2 form the output terminals of the first load branch and the second load branch respectively. The illustration is made by taking the first load branch as an example. One terminal of the first output capacitor Co1 which is connected to the dotted end of the first secondary winding WT1 is a positive output terminal of the first load branch, and the other terminal of the first output capacitor Co1 which is connected to the anode of the first diode D1 is a negative output terminal of the first load branch. The load A1 is connected in parallel with the first output capacitor Co1.

As shown in FIG. 9, in order to balance the current of the multiple loads of the constant current driving circuit, the secondary side of the transformer Ta1 further includes a first current sharing transformer T1. The first current sharing transformer T1 includes a first current sharing winding W1 and a second current sharing winding W2 which are connected in series in the first load branch and the second load branch respectively.

According to the seventh embodiment of the invention, for each of the load branches, each of the current sharing windings of the first current sharing transformer T1 is connected in series between the dotted end of the first secondary winding WT1 and the positive output terminal of respective one of the load branches. Specifically:

for the first load branch, the dotted end of the first current sharing winding W1 is connected to the dotted end of the first secondary winding WT1, and the non-dotted end of the first current sharing winding W1 is connected to the positive output terminal of the first load branch, and for the second load branch, the non-dotted end of the second current sharing winding W2 is connected to the dotted end of the first secondary winding WT1, and the dotted end of the second current sharing winding W2 is connected to the positive output terminal of the second load branch.

According to the embodiment of the invention, the first secondary winding WT1 has a tap end. As shown in FIG. 9, the tap end divides the first secondary winding WT1 into a first secondary sub-winding WT11 and a second secondary sub-winding WT12. The non-dotted end of the first secondary sub-winding WT11 is the dotted end of the second secondary sub-winding WT12; the common end of the first secondary sub-winding WT11 and the second secondary sub-winding WT12 is the tap end of the first secondary winding WT1.

As shown in FIG. 9, an open-circuit protection module 50 is provided for each of the load branches. The open-circuit protection module 50 is connected between the tap end of the first secondary winding WT1 and the positive output terminal of respective one of the load branches.

An illustration is made by taking the first load branch as an example. The open-circuit protection module 50 is connected in parallel between the tap end of the first secondary winding WT1 and the positive output terminal of the first load branch. The open-circuit protection module 50 includes a detection control unit 501 and a processing unit 502.

The detection control unit 501 is adapted to detect an output voltage of the first load branch or a voltage proportional to the output voltage. When the output voltage of the first load branch or the voltage proportional to the output voltage is not less than the corresponding preset threshold, the detection control unit 501 outputs a control signal to the processing unit 502.

The processing unit 502 is connected in parallel between the tap end of the first secondary winding WT1 and the positive output terminal of the first load branch. That is to say, as shown in FIG. 9, the processing unit 502 is connected in parallel with a path formed by the first secondary sub-winding WT11 and the first current sharing winding W1. The processing unit 502 is adapted to short the first secondary sub-winding WT11 and the first current sharing winding W1 when the processing unit 502 receives the control signal.

Similarly, for the second load branch, the open-circuit protection module 50 is connected in parallel between the tap end of the first secondary winding WT1 and the positive output terminal of the second load branch. The open-circuit protection module 50 includes a detection control unit 501 and a processing unit 502.

The detection control unit 501 is adapted to detect an output voltage of the second load branch or a voltage proportional to the output voltage. When the output voltage of the second load branch or the voltage proportional to the output voltage is not less than the corresponding preset threshold, the detection control unit 501 outputs a control signal to the processing unit 502.

The processing unit 502 is connected in parallel between the tap end of the first secondary winding WT1 and the positive output terminal of the second load branch. That is to say, as shown in FIG. 9, the processing unit 502 is connected in parallel with a path formed by the first secondary sub-winding WT11 and the second current sharing winding W2. The processing unit 502 is adapted to short the first secondary sub-winding WT11 and the second current sharing winding W2 when the processing unit 502 receives the control signal.

In this embodiment, taking the first load branch for example, if the load A1 is open circuited, the detection control unit 501 detects that the output voltage of the first load branch or the voltage proportional to the output voltage is not less than the corresponding preset threshold and outputs a control signal to the processing unit 502, so that the processing unit 502 shorts the first secondary sub-winding WT11 and the first current sharing winding W1. The circuit according to the present embodiment does not directly short the first output capacitor Co1, so that the processing unit 502 bears a smaller impulse current, thereby the current stresses on the related components in the processing unit 502 are reduced. Accordingly, in the present embodiment, related components withstood smaller current stresses can be used for the processing unit 502, so that the cost for the open-circuit protection is reduced.

Moreover, in this embodiment, when a load branch is open circuited, the open-circuit protection module connected in parallel in the load branch only shorts the secondary sub-winding which is connected to the current sharing winding. Therefore, when the processing unit of the open-circuit protection module performs the shorting, the current sharing winding of the current sharing transformer connected in series in the load branch bears a voltage smaller than ½ of the voltage output by the load branch, so that the bulk of the current sharing transformer can be reduced.

It should be noted that, as shown in FIG. 9, an implementation of the processing unit is given. Of course, in other embodiments of the invention, the processing unit can also be implemented in other ways.

Specifically, the illustration is made by taking the first load branch as an example. As shown in FIG. 9, the processing unit 502 may include a second diode D11, a first capacitor C1 and a switching device S1. A first terminal of the switching device S1 is connected to the positive output terminal of the first load branch, a second terminal of the switching device S1 is connected to an anode of the second diode D11, a cathode of the second diode D11 is connected to the tap end of the first secondary winding WT1; a control terminal of the switching device S1 is connected to a control signal output terminal of the detection control unit 501; and the first capacitor C1 is connected in parallel with the switching device S1 between the first and second terminals of the switching device S1. The first capacitor C1 is used for filtering.

When the detection control unit 501 detects that the load in the load branch operates normally, the switching device S1 in the control processing unit 502 is open circuited or in a high impedance state; when the detection control unit 501 detects that the load is open circuited or has an over voltage (specifically, the output voltage of the load branch or the voltage proportional to the output voltage is not less than the corresponding preset threshold), the switching device S1 in the processing unit 502 is controlled to be in on state or in a low impedance state, so that the branch which has the first secondary sub-winding WT11 of the transformer Ta1 and the current sharing winding of the current sharing transformer T1 is in a low impedance state.

In the embodiment of the invention, the detection control unit 501 can be adapted to detect the output voltage of each of the load branches and can also be adapted to detect the voltage proportional to the output voltage of each of the load branches, which is the same as those in the above-mentioned embodiments and will not be described in detail herein.

Similarly, if the secondary side of the transformer Ta1 includes multiple secondary windings, the current sharing windings of the current sharing transformer may also be connected in series between the dotted end of each of the secondary windings and the positive output terminal of the corresponding load branch respectively. In this case, the open-circuit protection circuits according to the embodiments of the invention are still applicable. Specifically, reference is made to FIG. 10 which is a circuit diagram of an open-circuit protection circuit of a constant current driving circuit for light emitting diodes according to an eighth embodiment of the invention. In the eighth embodiment of the invention, the illustration is made by taking the transformer Ta1 having two secondary windings as an example.

The transformer Ta1 includes two secondary windings, i.e. a first secondary winding WT1 and a second secondary winding WT2; the circuit includes two load branches, in which a first load branch is connected to the first secondary winding WT1 and a second load branch is connected to the second secondary winding WT2. The respective current sharing windings of the first current sharing transformer T1 are connected in series between the dotted end of the respective secondary windings and the positive output terminal of the respective load branches. The connection between each of the load branches and each of the secondary windings is the same as that in the seventh embodiment.

Figure 10:
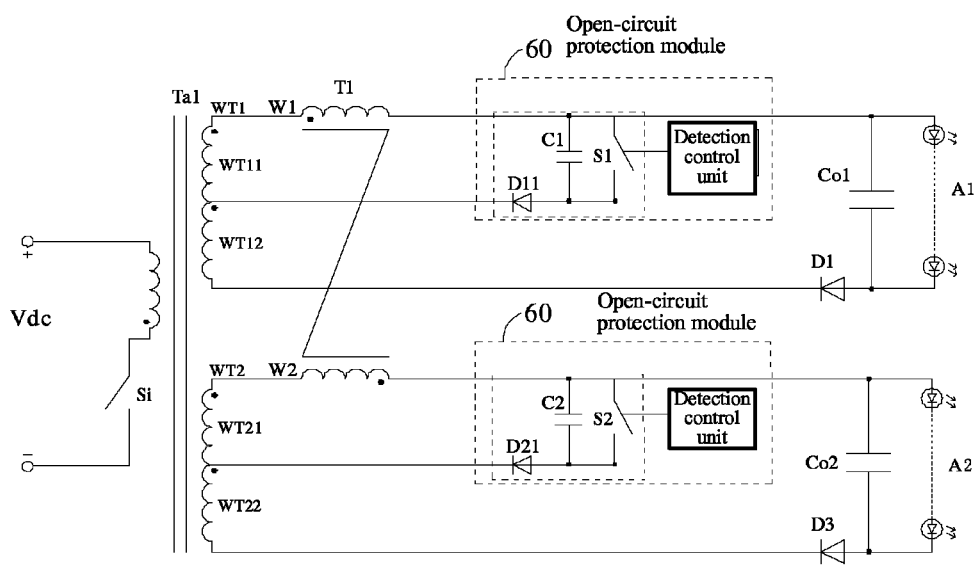
FIG. 10 is a circuit diagram of an open-circuit protection circuit of a constant current driving circuit for light emitting diodes according to an eighth embodiment of the invention.

As shown in FIG. 10, an open-circuit protection module 60 is provided for each of the load branches. The connection and the working principle of the open-circuit protection module 60 are the same as those in the seventh embodiment shown in FIG. 9 and will not be described in detail herein.

Figure 11:
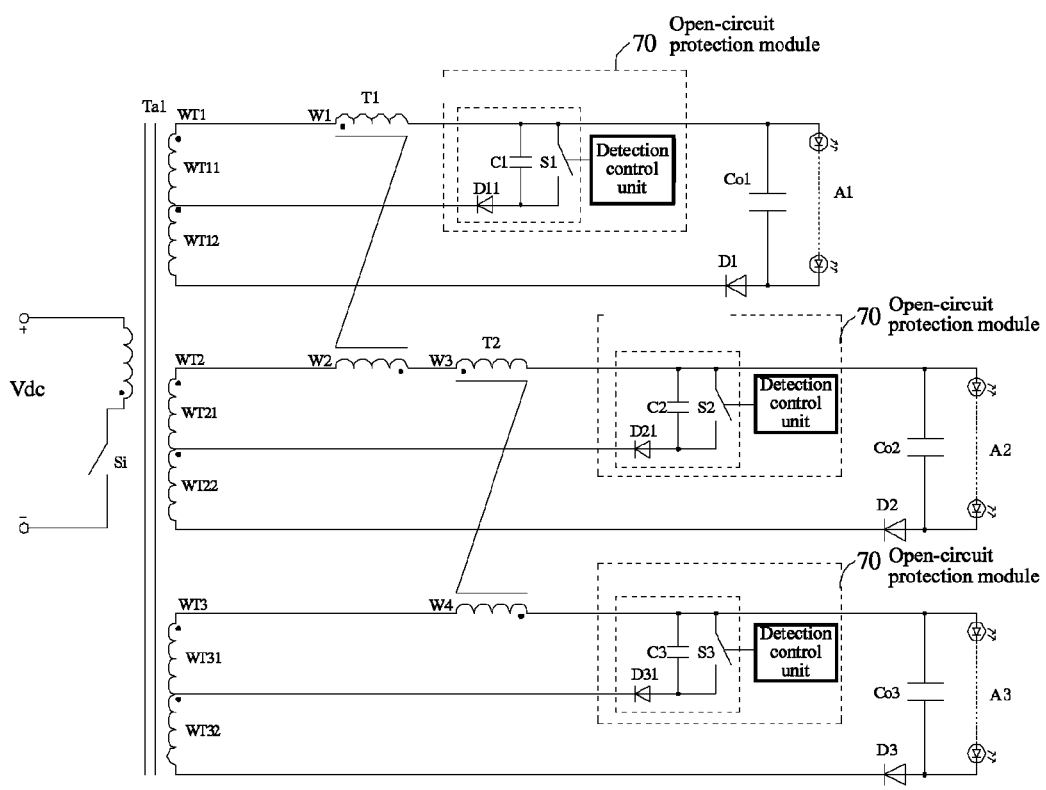
FIG. 11 is a circuit diagram of an open-circuit protection circuit of a constant current driving circuit for light emitting diodes according to a ninth embodiment of the invention.

Reference is made to FIG. 11 which is a circuit diagram of an open-circuit protection circuit of a constant current driving circuit for light emitting diodes according to a ninth embodiment of the invention. The open-circuit protection circuit of the constant current driving circuit according to the ninth embodiment is different from the circuit according to the eighth embodiment shown in FIG. 10 in that the circuit includes three secondary windings WT1 to WT3, in which each of the secondary windings is connected to a load branch.

In this case, the circuit requires two current sharing transformers T1 and T2 for sequentially connecting load branches of adjacent two secondary windings, as shown in FIG. 11.

In this case, an open-circuit protection module 70 is connected for each of the load branches, wherein the connection and the working principle are the same as those described in the above mentioned embodiments and are not described in detail herein.

In other embodiments of the invention, in the case that the secondary side of the transformer Ta1 includes N secondary windings, N–1 current sharing transformers are needed for sequentially connecting the load branches of two adjacent secondary windings. The open-circuit protection circuits according to the embodiments of the invention are also applicable in the case of N secondary windings, which will not be described in detail herein.

Of course, in practical applications, there is also a case that one secondary winding is connected to N load branches. In this case, there are also needed N–1 current sharing transformers for sequentially connecting adjacent two load branches of the secondary winding.

Figure 12:
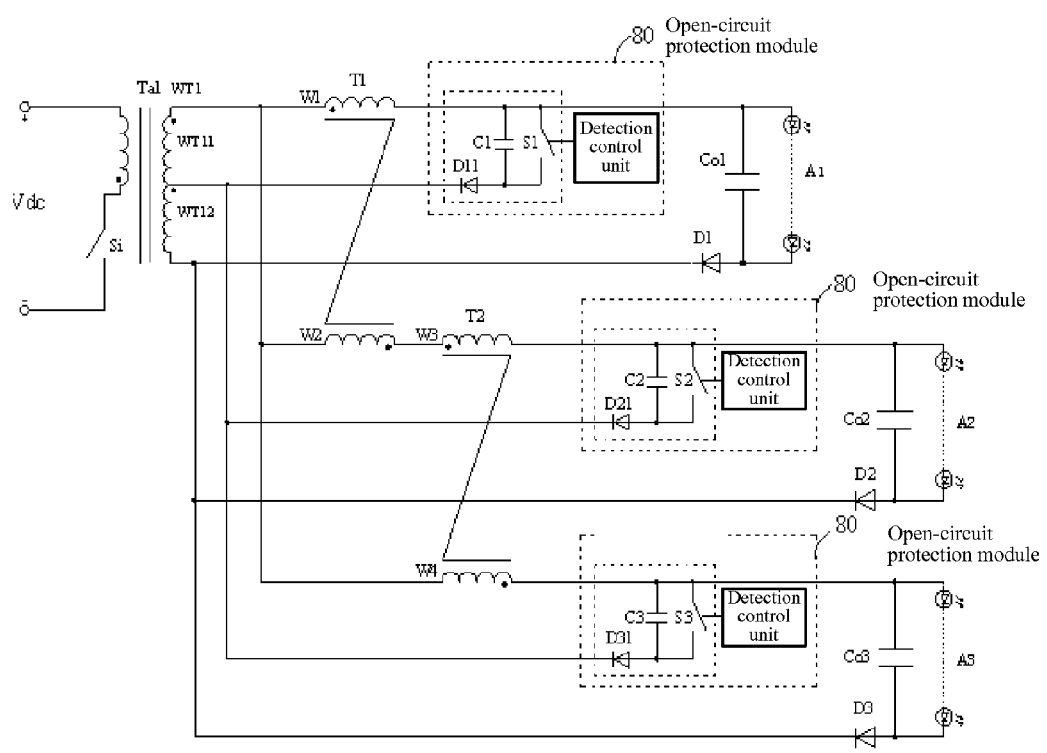
FIG. 12 is a circuit diagram of an open-circuit protection circuit of a constant current driving circuit for light emitting diodes according to a tenth embodiment of the invention.

Reference is made to FIG. 12 which is a circuit diagram of an open-circuit protection circuit of a constant current driving circuit for light emitting diodes according to a tenth embodiment of the invention. In the tenth embodiment of the invention, an illustration is made by taking the first secondary winding WT1 being connected to three load branches as an example.

In this case, the circuit requires two current sharing transformers T1 and T2 for sequentially connecting the adjacent two load branches of the first secondary winding WT1. As shown in FIG. 12, a first current sharing transformer T1 is connected to a first load branch and a second load branch; and a second current sharing transformer T2 is connected to the second load branch and a third load branch.

In this case, an open-circuit protection module 80 is connected for each of the load branches, wherein the connection and the working principle are the same as those described in the above mentioned embodiments and are not described in detail herein.

Figure 13:
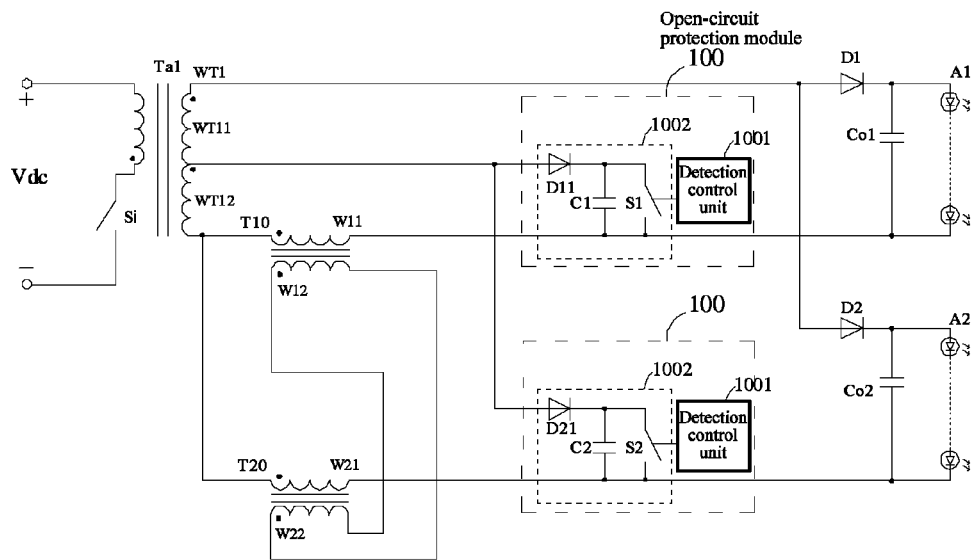
FIG. 13 is a circuit diagram of an open-circuit protection circuit of a constant current driving circuit for light emitting diodes according to an eleventh embodiment of the invention.

In the above mentioned embodiments, for the constant current driving circuit with multiple loads, the balance for the current of the multiple loads is achieved by connecting in series the primary and secondary windings of the current sharing transformer respectively. In practical applications, the balance can also be achieved by connecting in series secondary windings of two current sharing transformers (specifically, the secondary windings of the two current sharing transformers are connected from one to another). Reference is made to FIG. 13 which is a circuit diagram of an open-circuit protection circuit of a constant current driving circuit for light emitting diodes according to an eleventh embodiment of the invention.

As shown in FIG. 13, the circuit includes a transformer Ta1. The primary side of the transformer Ta1 includes a primary winding and a switch Si.

A secondary side of the transformer Ta1 includes a first secondary winding WT1 which has two load branches connected with a load A1 and a load A2 respectively. Each of the load branches has a same structure, and the circuit structure of each of the load branches is the same as that described in the first embodiment shown in FIG. 3 and will not be described in detail herein.

As shown in FIG. 13, in order to balance the current of the multiple loads of the constant current driving circuit, the secondary side of the transformer Ta1 further includes a first current sharing transformer T10 and a second current sharing transformer T20.

The first current sharing transformer T10 includes a primary current sharing winding W11 and a secondary current sharing winding W12; and the second current sharing transformer T20 includes a primary current sharing winding W21 and a secondary current sharing winding W22. Specifically, a dotted end of the primary current sharing winding W11 of the first current sharing transformer T10 is connected to an non-dotted end of the first secondary winding WT1, and an non-dotted end of the primary current sharing winding W11 of the first current sharing transformer T10 is connected to a negative output terminal of a first load branch; a dotted end of the primary current sharing winding W21 of the second current sharing transformer T20 is connected to an non-dotted end of the first secondary winding WT1, and an non-dotted end of the primary current sharing winding W21 of the second current sharing transformer T20 is connected to a negative output terminal of a second load branch; a dotted end of the secondary current sharing winding W12 of the first current sharing transformer T10 is connected to an non-dotted end of the secondary current sharing winding W22 of the second current sharing transformer T20, and an non-dotted end of the secondary current sharing winding W12 of the first current sharing transformer T10 is connected to a dotted end of the secondary current sharing winding W22 of the second current sharing transformer T20.

According to the embodiment of the invention, the first secondary winding WT1 has a tap end. As shown in FIG. 13, the tap end divides the first secondary winding WT1 into a first secondary sub-winding WT11 and a second secondary sub-winding WT12.

As shown in FIG. 13, an open-circuit protection module 100 is provided for each of the load branches. The open-circuit protection module 100 is connected between the tap end of the first secondary winding WT1 and the negative output terminal of respective one of the load branches.

An illustration is made by taking the first load branch as an example. The open-circuit protection module 100 is connected in parallel between the tap end of the first secondary winding WT1 and the negative output terminal of the first load branch. The open-circuit protection module 100 includes a detection control unit 1001 and a processing unit 1002.

The detection control unit 1001 is adapted to detect an output voltage of the first load branch or a voltage proportional to the output voltage. When the output voltage of the first load branch or the voltage proportional to the output voltage is not less than the corresponding preset threshold, the detection control unit 1001 outputs a control signal to the processing unit 1002.

The processing unit 1002 is connected in parallel between the tap end of the first secondary winding WT1 and the negative output terminal of the first load branch. That is to say, as shown in FIG. 13, the processing unit 1002 is connected in parallel with a path formed by a second secondary sub-winding WT12 and a primary current sharing winding W11 of a first current sharing transformer T10. The processing unit 1002 is adapted to short the second secondary sub-winding WT12 and the primary current sharing winding W11 of the first current sharing transformer T10 when the processing unit 1002 receives the control signal.

Similarly, for the second load branch, the open-circuit protection module 100 is connected in parallel between the tap end of the first secondary winding WT1 and the negative output terminal of the second load branch. The open-circuit protection module 100 includes a detection control unit 1001 and a processing unit 1002.

The detection control unit 1001 is adapted to detect an output voltage of the second load branch or a voltage proportional to the output voltage. When the output voltage of the second load branch or the voltage proportional to the output voltage is not less than the corresponding preset threshold, the detection control unit 1001 outputs a control signal to the processing unit 1002.

The processing unit 1002 is connected in parallel between the tap end of the first secondary winding WT1 and the negative output terminal of the second load branch. That is to say, as shown in FIG. 13, the processing unit 1002 is connected in parallel with a path formed by the second secondary sub-winding WT12 and the primary current sharing winding W21 of the second current sharing transformer T20. The processing unit 1002 is adapted to short the second secondary sub-winding WT12 and the primary current sharing winding W21 of the second current sharing transformer T20 when the processing unit 1002 receives the control signal.

In this embodiment, taking the first load branch for example, if the load A1 is open circuited, the detection control unit 1001 detects that the output voltage of the first load branch or the voltage proportional to the output voltage is not less than the corresponding preset threshold and outputs a control signal to the processing unit 1002, so that the processing unit 1002 shorts the second secondary sub-winding WT12 and the primary current sharing winding W11 of the first current sharing transformer T10. The circuit according to the present embodiment does not directly short the first output capacitor Co1, so that the processing unit 1002 bears a smaller impulse current, thereby the current stresses on the related components in the processing unit 1002 are reduced. Accordingly, in the present embodiment, related components withstood smaller current stresses can be used for the processing unit 1002, so that the cost for the open-circuit protection is reduced.

Moreover, in this embodiment, when a load branch is open circuited, the open-circuit protection module connected in parallel in the load branch only shorts a secondary sub-winding connected to the primary current sharing winding of the current sharing transformer. Therefore, when the processing unit of the open-circuit protection module performs the shorting, the primary current sharing winding of the current sharing transformer connected in series in the load branch bears a voltage smaller than ½ of the voltage output by the load branch, so that the bulk of the current sharing transformer can be reduced.

It should be noted that the circuit shown in FIG. 13 shows an implementation of the processing unit. Of course, in other embodiments of the invention, the processing unit can also be implemented in other ways.

Specifically, the illustration is made by taking the first load branch as an example. As shown in FIG. 13, the processing unit 1002 may include a second diode D11, a first capacitor C1 and a switching device S1. An anode of the second diode D11 is connected to the tap end of the first secondary winding WT1, and a cathode of the second diode D11 is connected to a first terminal of the switching device S1; a second terminal of the switching device S1 is connected to the negative output terminal of the first load branch, and a control terminal of the switching device S1 is connected to a control signal output terminal of the detection control unit 1001; and the first capacitor C1 is connected in parallel with the switching device S1 between the first and second terminals of the switching device S1. The first capacitor C1 is used for filtering.

When the detection control unit 1001 detects that the load in the load branch operates normally, the switching device S1 in the control processing unit 1002 is open circuited or in a high impedance state; when the detection control unit 1001 detects that the load is open circuited or has an over voltage (specifically, the output voltage of the load branch or the voltage proportional to the output voltage is not less than the corresponding preset threshold), the switching device S1 in the processing unit 1002 is controlled to be in on state or in a low impedance state, so that the branch which has the second secondary sub-winding WT12 of the transformer Ta1 and the primary current sharing winding W11 of the first current sharing transformer T10 is in a low impedance state In the embodiment of the invention, the detection control unit 1001 can be adapted to detect the output voltage of each of the load branches and can also be adapted to detect the voltage proportional to the output voltage of each of the load branches. In the following, the illustration is made by taking only the first situation as an example.

Figure 14:
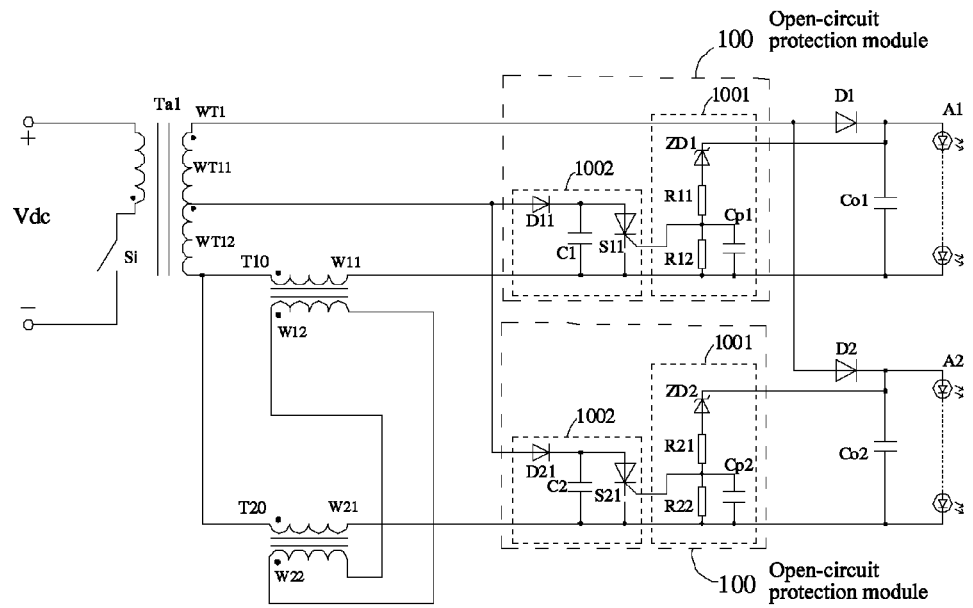
FIG. 14 is a circuit diagram of an open-circuit protection circuit of a constant current driving circuit for light emitting diodes according to a twelfth embodiment of the invention.

Reference is made to FIG. 14 which is a circuit diagram of an open-circuit protection circuit of a constant current driving circuit for light emitting diodes according to a twelfth embodiment of the invention. FIG. 14 shows an implementation of the detection control unit of the open-circuit protection circuit shown in FIG. 13. In FIG. 14, the detection control unit detects the output voltage of each of the load branches. Of course, in other embodiments of the invention, the detection control unit can also be implemented in other ways.

In the open-circuit protection circuit shown in FIG. 14, the illustration is made also by taking the first load branch as an example. For the open-circuit protection module 100, the detection control unit 1001 includes: a zener diode ZD1, a first resistor R11, a second resistor R12, a first filter capacitor Cp1; and the difference of the processing unit 1002 from that shown in FIG. 13 is that the switching device S1 is a thyristor S11.

It should be noted that in the twelfth embodiment of the invention the detection control circuit 1001 is adapted to detect whether the output voltage of each of the load branches exceeds a preset threshold. Therefore, correspondingly, the detection control circuit 1001 is connected between the positive output terminal and the negative output terminal of each of the load branches.

Specifically, the cathode of the zener diode ZD1 is connected to the positive output terminal of the first load branch, and the anode of the zener diode ZD1 is connected to the negative output terminal of the first load branch via the first resistor R11 and second resistor R12, and the first filter capacitor Cp1 is connected in parallel with the second resistor R12.

The gate electrode of the thyristor S11 is a control terminal of the processing unit 1002 and is connected to a common end of the first resistor R11 and the second resistor R12. The anode of the thyristor S11 is connected to the cathode of the second diode D11. The anode of the second diode D11 is connected to the tap end of the first secondary winding WT1. The cathode of the thyristor S11 is connected to the negative output terminal of the first load branch. The first capacitor C1 is connected in parallel with the switching device between the first and second terminals of the switching device.

In practical applications, the detection control unit can also determine whether the output voltage is normal indirectly depending on any voltage detected in the load branch that is proportional to the output voltage, so as to determine whether to perform the open-circuit protection on the load branch. This can be achieved by many ways and will not be described in detail herein.

Figure 15:
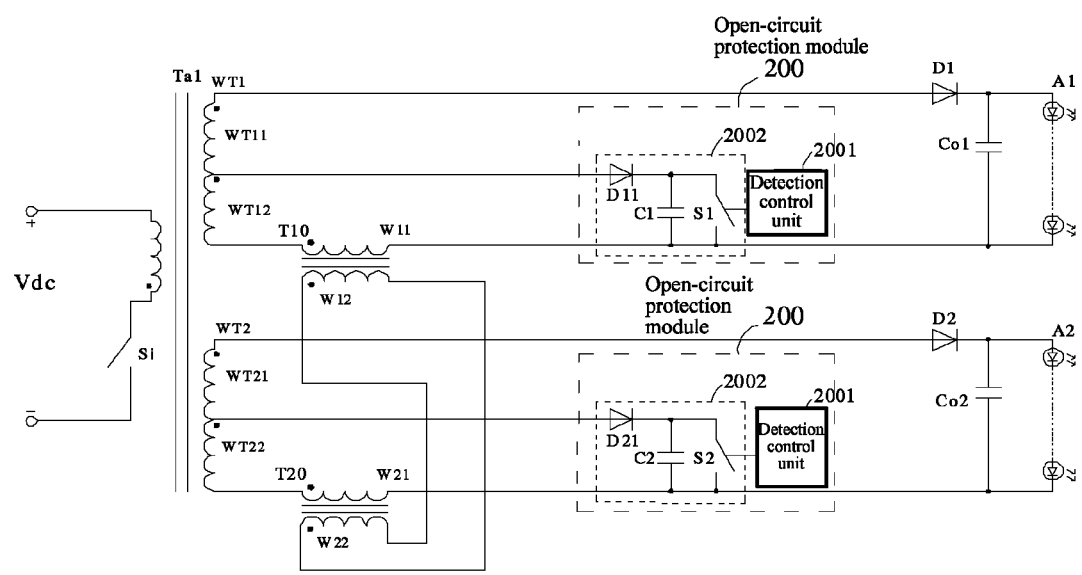
FIG. 15 is a circuit diagram of an open-circuit protection circuit of a constant current driving circuit for light emitting diodes according to a thirteenth embodiment of the invention.

In the eleventh to twelfth embodiments of the invention, the secondary side of the transformer Ta1 includes only one winding. In the practical application, the secondary side of the transformer Ta1 may also include multiple secondary windings. In this case, the open-circuit protection modules according to the embodiments of the invention are still applicable. Reference is made to FIG. 15 which is a circuit diagram of an open-circuit protection circuit of a constant current driving circuit for light emitting diodes according to a thirteenth embodiment of the invention. In the thirteenth embodiment of the invention, the illustration is made by taking the transformer Ta1 having two secondary windings as an example.

The open-circuit protection circuit of the constant current driving circuit according to the thirteenth embodiment shown in FIG. 15 is different from the circuit according to the eleventh embodiment shown in FIG. 13 in that the transformer Ta1 includes two secondary windings, i.e. a first secondary winding WT1 and a second secondary winding WT2; the circuit includes two load branches, in which a first load branch is connected to the first secondary winding WT1 and a second load branch is connected to the second secondary winding WT2. The connection between each of the load branches and each of the secondary windings is the same as that of the eleventh embodiment.

As shown in FIG. 15, each of the primary current sharing windings of the current sharing transformers is connected in series between the non-dotted end of respective secondary windings and the negative output terminal of respective load branches. Specifically, for the first load branch, the dotted end of the primary current sharing winding W11 of the first current sharing transformer T10 is connected to the non-dotted end of the first secondary winding WT1, the non-dotted end of the primary current sharing winding W11 of the first current sharing transformer T10 is connected to the negative output terminal of the first load branch, and for the second load branch, the dotted end of the primary current sharing winding W21 of the second current sharing transformer T20 is connected to the non-dotted end of the second secondary winding WT2, the non-dotted end of the primary current sharing winding W21 of the second current sharing transformer T20 is connected to the negative output terminal of the second load branch.

In the embodiment of the invention, both the first secondary winding WT1 and the second secondary winding WT2 have tap ends.

As shown in FIG. 15, an open-circuit protection module 200 is provided for each of the load branches. Each of the open-circuit protection modules 20 is connected between the tap end of the respective secondary windings and the negative output terminal of the load branch including the secondary winding. The open-circuit protection module 200 includes a detection control unit 2001 and a processing unit 2002.

The detection control unit 2001 is adapted to output a control signal to the processing unit 2002 when the detection control unit 2001 detects that the output voltage of each of the load branches or the voltage proportional to the output voltage is not less than a corresponding preset threshold.

The processing unit 2002 is adapted to short the branch including the secondary sub-winding connected to the primary current sharing winding of the current sharing transformer when the processing unit 2002 receives the control signal.

In practical applications, in the case that the secondary side of the transformer Ta1 includes multiple secondary windings, if each of the primary current sharing windings of the current sharing transformers is connected in series between the non-dotted end of respective secondary windings and the negative output terminal of the load branch corresponding to the secondary winding, the open-circuit protection modules according to the above mentioned embodiments are still applicable.

Figure 16:
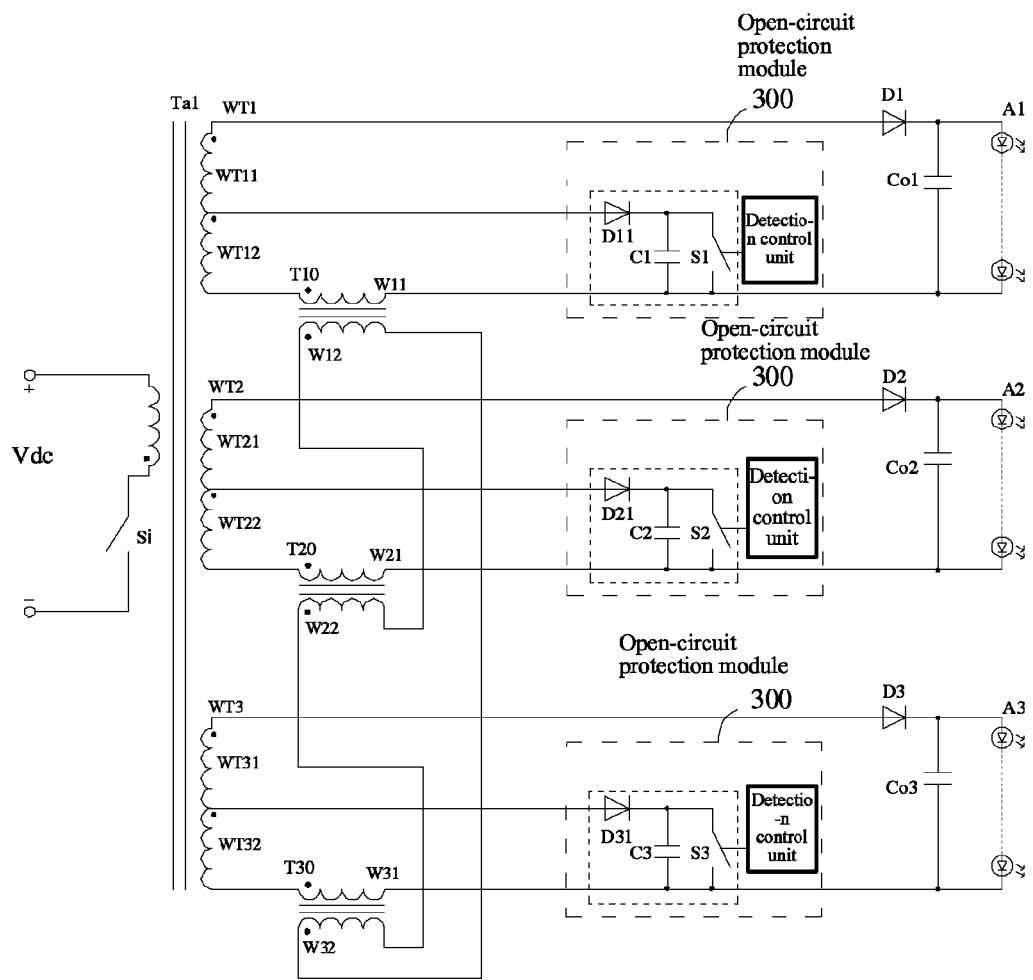
FIG. 16 is a circuit diagram of an open-circuit protection circuit of a constant current driving circuit for light emitting diodes according to a fourteenth embodiment of the invention.

Reference is made to FIG. 16 which is a circuit diagram of an open-circuit protection circuit of a constant current driving circuit for light emitting diodes according to a fourteenth embodiment of the invention. The open-circuit protection circuit of the constant current driving circuit for light emitting diodes according to the fourteenth embodiment is different from the circuit according to the thirteenth embodiment shown in FIG. 15 in that the circuit includes three secondary windings WT1 to WT3, in which each of the secondary windings is connected to a load branch respectively.

In this case, the circuit requires three current sharing transformers T10, T20 and T30 for sequentially connecting load branches of adjacent two secondary windings. As shown in FIG. 16, a first current sharing transformer T10 and a second current sharing transformer T20 are connected to a first load branch including the first secondary winding WT1 and a second load branch including the second secondary winding WT2; the second current sharing transformer T20 and a third current sharing transformer T30 are connected to the second load branch including the second secondary winding WT2 and a third load branch including the third secondary winding WT3.

As shown in FIG. 16, the dotted end of the primary current sharing winding W11 of the first current sharing transformer T10 is connected to the non-dotted end of the first secondary winding WT1, and the non-dotted end of the primary current sharing winding W11 of the first current sharing transformer T10 is connected to the negative output terminal of the first load branch; the dotted end of the primary current sharing winding W21 of the second current sharing transformer T20 is connected to the non-dotted end of the second secondary winding WT2, and the non-dotted end of the primary current sharing winding W21 of the second current sharing transformer T20 is connected to the negative output terminal of the second load branch; and the dotted end of the primary current sharing winding W31 of the third current sharing transformer T30 is connected to the non-dotted end of the third secondary winding WT3, and the non-dotted end of the primary current sharing winding W31 of the third current sharing transformer T30 is connected to the negative output terminal of the third load branch.

The dotted end of the secondary current sharing winding W12 of the first current sharing transformer T10 is connected to the non-dotted end of the secondary current sharing winding W22 of the second current sharing transformer T20, the dotted end of the secondary current sharing winding W22 of the second current sharing transformer T20 is connected to the non-dotted end of the secondary current sharing winding W32 of the third current sharing transformer T30, and the dotted end of the secondary current sharing winding W32 of the third current sharing transformer T30 is connected to the non-dotted end of the secondary current sharing winding W12 of the first current sharing transformer T10.

In this case, an open-circuit protection module 300 is connected for each of the load branches, wherein the connection and the working principle are the same as those described in the above mentioned embodiments and are not described in detail herein.

In other embodiments of the invention, in the case that the secondary side of the transformer Ta1 includes N secondary windings, N current sharing transformers are needed for sequentially connecting the load branches of two adjacent secondary windings. The open-circuit protection circuits according to the embodiments of the invention are also applicable in the case of N secondary windings, which will not be described in detail herein.

Of course, in practical applications, there is also a case that one secondary winding is connected to N load branches. In this case, there are also needed N current sharing transformers for sequentially connecting adjacent two load branches of the secondary winding.

Figure 17:
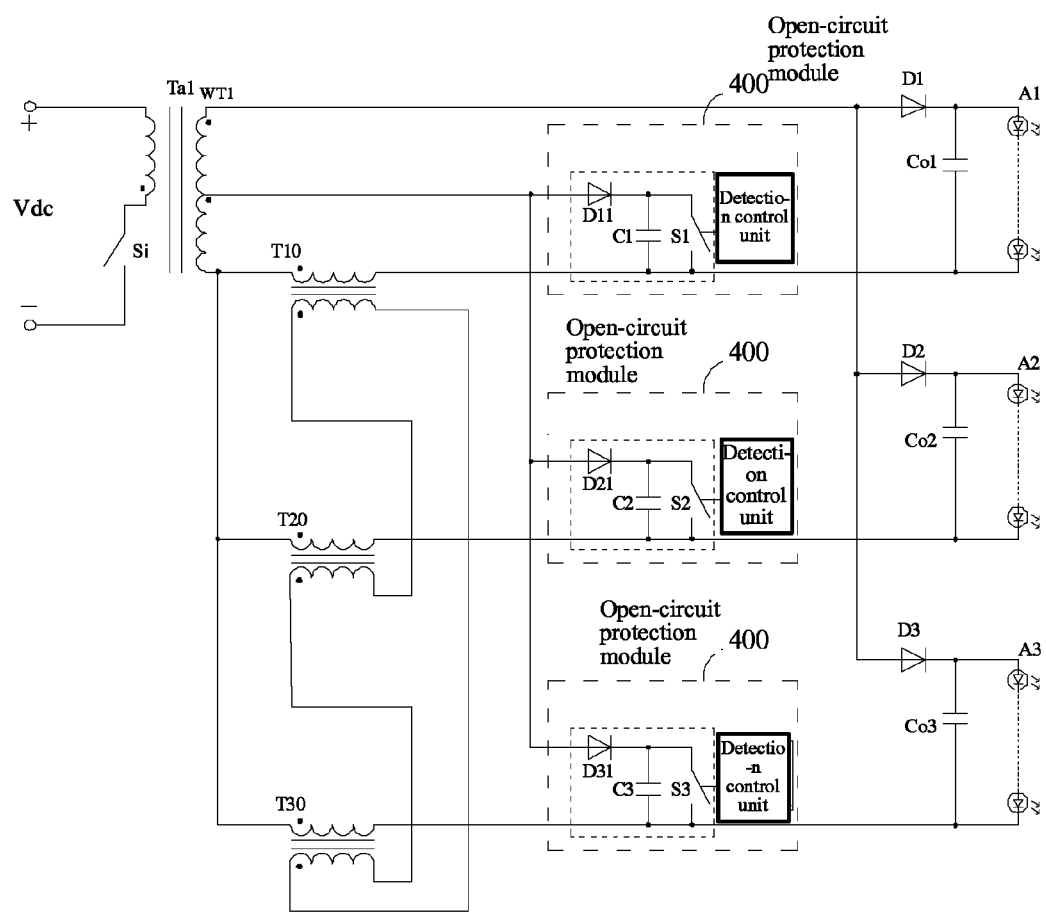
FIG. 17 is a circuit diagram of an open-circuit protection circuit of a constant current driving circuit for light emitting diodes according to a fifteenth embodiment of the invention.

Reference is made to FIG. 17 which is a circuit diagram of an open-circuit protection circuit of a constant current driving circuit for light emitting diodes according to a fifteenth embodiment of the invention. In the fifteenth embodiment of the invention, an illustration is made by taking the first secondary winding WT1 being connected to three load branches as an example.

In this case, the circuit requires three current sharing transformers T10, T20 and T30 for sequentially connecting the adjacent two load branches of the first secondary winding WT1.

In this case, an open-circuit protection module 400 is connected for each of the load branches, wherein the connection and the working principle are the same as those described in the above mentioned embodiments and are not described in detail herein.

In the open-circuit protection circuit according to any of the eleventh to fifteenth embodiments of the invention, the primary current sharing winding of each of the current sharing transformers is connected in series between the non-dotted end of the secondary winding and the negative output terminal of respective load branches. In practical applications, the primary current sharing winding of the current sharing transformer can also be connected between the dotted end of the secondary winding and the positive output terminal of respective load branches.

Figure 18:
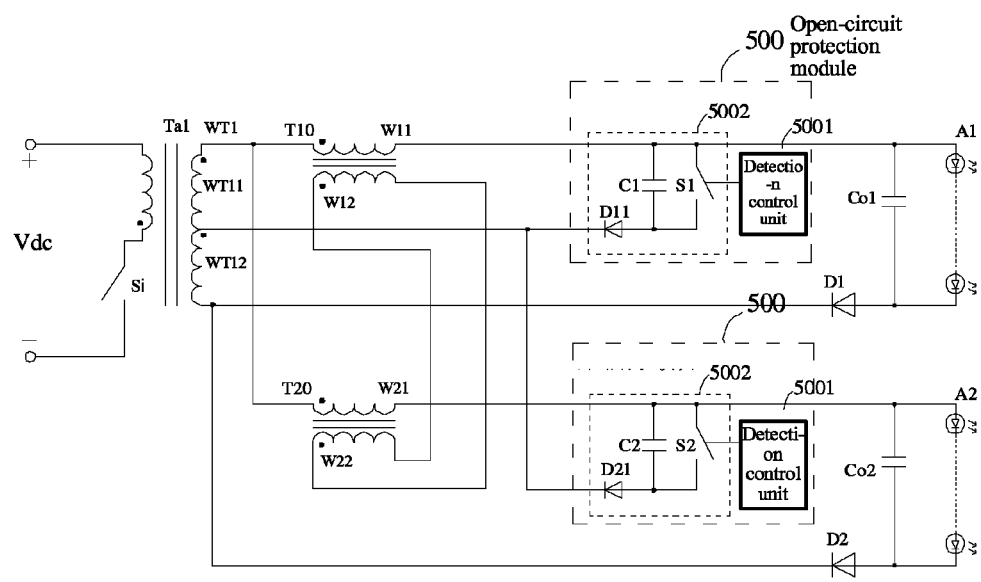
FIG. 18 is a circuit diagram of an open-circuit protection circuit of a constant current driving circuit for light emitting diodes according to a sixteenth embodiment of the invention.

Reference is made to FIG. 18 which is a circuit diagram of an open-circuit protection circuit of a constant current driving circuit for light emitting diodes according to a sixteenth embodiment of the invention. The open-circuit protection circuit of the constant current driving circuit shown in FIG. 18 is different from the eleventh embodiment shown in FIG. 13 in that the primary current sharing winding of each of the current sharing transformers is connected in series between the dotted end of the first secondary winding and the positive output terminal of respective load branches.

As shown in FIG. 18, a secondary side of the transformer Ta1 includes a first secondary winding WT1 which has two load branches connected with a load A1 and a load A2 respectively. Each of the load branches has a same structure.

in the first load branch, a dotted end of the first secondary winding WT1 is connected to an anode of a first diode D1 via a first output capacitor Co1, and a cathode of the first diode D1 is connected to an non-dotted end of the first secondary winding WT1; and in the second load branch, a dotted end of the first secondary winding WT1 is connected to an anode of a first diode D2 via a first output capacitor Co2, and a cathode of the first diode D2 is connected to an non-dotted end of the first secondary winding WT1.

The first output capacitors Co1 and Co2 form the output terminals of the first load branch and the second load branch respectively. The illustration is made by taking the first load branch as an example. One terminal of the first output capacitor Co1 which is connected to the dotted end of the first secondary winding WT1 is a positive output terminal of the first load branch, and one terminal of the first output capacitor Co1 which is connected to the anode of the first diode D1 is a negative output terminal of the first load branch. The load A1 is connected in parallel with the first output capacitor Co1.

As shown in FIG. 18, in order to balance the current of the multiple loads of the constant current driving circuit, the secondary side of the transformer Ta1 further includes a first current sharing transformer T10 and a second current sharing transformer T20.

A dotted end of a primary current sharing winding W11 of the first current sharing transformer T10 is connected to the dotted end of the first secondary winding WT1, and an non-dotted end of the primary current sharing winding W11 of the first current sharing transformer T10 is connected to the positive output terminal of the first load branch; a dotted end of a primary current sharing winding W21 of the second current sharing transformer T20 is connected to the dotted end of the first secondary winding WT1, and an non-dotted end of the primary current sharing winding W21 of the second current sharing transformer T20 is connected to the positive output terminal of the second load branch; a dotted end of the secondary current sharing winding W12 of the first current sharing transformer T10 is connected to an non-dotted end of the secondary current sharing winding W22 of the second current sharing transformer T20, and an non-dotted end of the secondary current sharing winding W12 of the first current sharing transformer T10 is connected to a dotted end of the secondary current sharing winding W22 of the second current sharing transformer T20.

According to the embodiment of the invention, the first secondary winding WT1 has a tap end which divides the first secondary winding WT1 into a first secondary sub-winding WT11 and a second secondary sub-winding WT12.

As shown in FIG. 18, an open-circuit protection module 500 is provided for each of the load branches. The open-circuit protection module 500 is connected between the tap end of the first secondary winding WT1 and the positive output terminal of each of the load branches.

An illustration is made by taking the first load branch as an example. The open-circuit protection module 500 is connected in parallel between the tap end of the first secondary winding WT1 and the positive output terminal of the first load branch. The open-circuit protection module 500 includes a detection control unit 5001 and a processing unit 5002.

The detection control unit 5001 is adapted to detect an output voltage of the first load branch or a voltage proportional to the output voltage. When the output voltage of the first load branch or the voltage proportional to the output voltage is not less than the corresponding preset threshold, the detection control unit 5001 outputs a control signal to the processing unit 5002.

The processing unit 5002 is connected in parallel between the tap end of the first secondary winding WT1 and the positive output terminal of the first load branch. That is to say, as shown in FIG. 18, the processing unit 5002 is connected in parallel with a path formed by the first secondary sub-winding WT11 and the primary winding W11 of the first current sharing transformer. The processing unit 5002 is adapted to short the first secondary sub-winding WT11 and the primary winding W11 of the first current sharing transformer when the processing unit 5002 receives the control signal.

Similarly, for the second load branch, the open-circuit protection module 500 is connected in parallel between the tap end of the first secondary winding WT1 and the positive output terminal of the second load branch. The open-circuit protection module 500 includes a detection control unit 5001 and a processing unit 5002.

The detection control unit 5001 is adapted to detect an output voltage of the second load branch or a voltage proportional to the output voltage. When the output voltage of the second load branch or the voltage proportional to the output voltage is not less than the corresponding preset threshold, the detection control unit 5001 outputs a control signal to the processing unit 5002.

The processing unit 5002 is connected in parallel between the tap end of the first secondary winding WT1 and the positive output terminal of the second load branch. That is to say, as shown in FIG. 18, the processing unit 5002 is connected in parallel with a path formed by the first secondary sub-winding WT11 and the primary winding W21 of the second current sharing transformer. The processing unit 5002 is adapted to short the first secondary sub-winding WT11 and the primary winding W21 of the second current sharing transformer when the processing unit 5002 receives the control signal.

It should be noted that the circuit shown in FIG. 18 shows an implementation of the processing unit. Of course, in other embodiments of the invention, the processing unit can also be implemented in other ways.

Specifically, the illustration is made by taking the first load branch as an example. As shown in FIG. 18, the processing unit 5002 may include a second diode D11, a first capacitor C1 and a switching device S1. A first terminal of the switching device S1 is connected to the positive output terminal of the first load branch, a second terminal of the switching device S1 is connected to an anode of the second diode D11, and a cathode of the second diode D11 is connected to the tap end of the first secondary winding WT1; a control terminal of the switching device S1 is connected to a control signal output terminal of the detection control unit 5001; and the first capacitor C1 is connected in parallel with the switching device S1 between the first and second terminals of the switching device S1. The first capacitor C1 is used for filtering.

In the embodiment of the invention, the detection control unit 5001 can be adapted to detect the output voltage of each of the load branches and can also be adapted to detect the voltage proportional to the output voltage of each of the load branches, which is the same as the above mentioned embodiments and will not be described in detail herein.

Similarly, if the secondary side of the transformer Ta1 includes multiple secondary windings, the current sharing windings of the current sharing transformers may also be connected in series between the dotted end of respective secondary windings and the positive output terminal of respective load branches. In this case, the open-circuit protection circuits according to the embodiments of the invention are still applicable. Specifically, reference is made to FIG. 19 which is a circuit diagram of an open-circuit protection circuit of a constant current driving circuit for light emitting diodes according to a seventeenth embodiment of the invention. In the seventeenth embodiment of the invention, the illustration is made by taking the transformer Ta1 having two secondary windings as an example.

The transformer Ta1 includes two secondary windings, i.e. a first secondary winding WT1 and a second secondary winding WT2; the circuit includes two load branches, in which a first load branch is connected to the first secondary winding WT1 and a second load branch is connected to the second secondary winding WT2. The respective current sharing windings of the first current sharing transformers T1 are connected in series between the dotted end of each of the secondary windings and the positive output terminal of each of the load branches. The connection between each of the load branches and each of the secondary windings is the same as that in the sixteenth embodiment.

Figure 19:
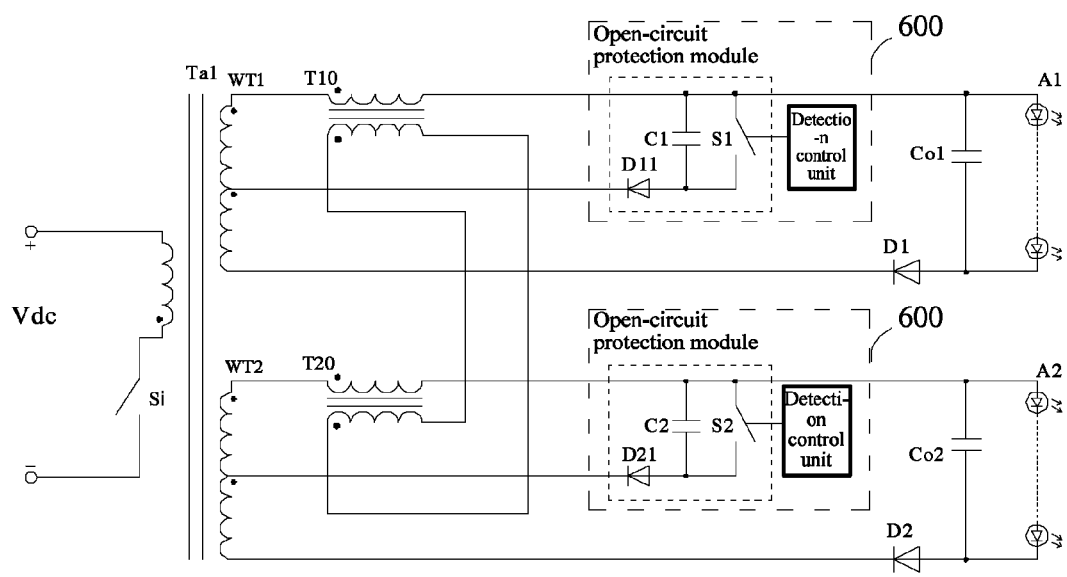
FIG. 19 is a circuit diagram of an open-circuit protection circuit of a constant current driving circuit for light emitting diodes according to a seventeenth embodiment of the invention.

As shown in FIG. 19, an open-circuit protection module 600 is provided for each of the load branches. The connection and the working principle of the open-circuit protection module 600 are the same as those in the sixteenth embodiment shown in FIG. 18 and will not be described in detail herein.

In other embodiments of the invention, in the case that the secondary side of the transformer Ta1 includes N secondary windings or one secondary winding is connected to N load branches, if the primary windings of the current sharing transformers are connected in series between the dotted end of each of the secondary windings and the positive output terminal of each of the load branches, the open-circuit protection circuits according to the embodiments of the invention are also applicable, wherein the connection and the working principle are the same as those described in the above mentioned embodiments and are not described in detail herein.

An open-circuit protection circuit of a constant current driving circuit for light emitting diodes according to the invention has been described in detail above. The principle and embodiments of the invention are described herein by employing the specific examples. The descriptions of the above embodiments are intended to facilitate understanding the method and core conception of the invention. Moreover, changes can be made to the implementations and the application scopes by the skilled in the art in the light of the conception of the invention. In summary, the content in the present specification should not be construed as limiting the invention.

What is claimed is:

1. An open-circuit protection circuit of a constant current driving circuit for light emitting diodes, comprising a transformer which comprises at least one secondary winding connected to at least two load branches, each of the load branches having a same structure; wherein:
   each of the load branches and the secondary winding form a rectification loop, and the secondary winding has a tap end which divides the secondary winding into two secondary sub-windings;
   the circuit further comprises a current sharing transformer provided in two adjacent load branches; and
   each of the load branches is connected to an open-circuit protection module which comprises a detection control unit and a processing unit, wherein:
      the detection control unit is configured to output a control signal to the processing unit when the detection control unit detects that an output voltage of the load branch or a voltage proportional to the output voltage is not less than a corresponding preset threshold; and
      the processing unit is configured to short the secondary sub-winding in the corresponding load branch and a current sharing winding of the current sharing transformer connected in series with the secondary sub-winding once the control signal is received.

2. The open-circuit protection circuit of the constant current driving circuit for light emitting diodes according to claim 1, wherein, in each of the load branches,
   a dotted end of the secondary winding is connected to an anode of a first diode, and a cathode of the first diode is connected to an non-dotted end of the secondary winding via a first output capacitor;
   one terminal of the first output capacitor which is connected to the cathode of the first diode serves as a positive output terminal of the load branch, and the other terminal of the first output capacitor serves as a negative output terminal of the load branch; and
   a winding of the current sharing transformer provided in the load branch and the adjacent load branch is connected in series between the non-dotted end of the secondary winding and the negative output terminal of the load branch comprising the secondary winding.

3. The open-circuit protection circuit of the constant current driving circuit for light emitting diodes according to claim 2, wherein the processing unit comprises a second diode, a first capacitor and a switching device, wherein:
   an anode of the second diode is connected to the tap end of the secondary winding, and a cathode of the second diode is connected to a first terminal of the switching device; a second terminal of the switching device is connected to the negative output terminal of the load branch, and a control terminal of the switching device is connected to a control signal output terminal of the detection control unit; and
   the first capacitor is connected in parallel with the switching device between the first and second terminals of the switching device.

4. The open-circuit protection circuit of the constant current driving circuit for light emitting diodes according to claim 3, wherein the detection control unit comprises a zener diode, a first resistor, a second resistor and a first filter capacitor;
   the switching device is a thyristor, an anode of the thyristor serves as the first terminal of the switching device, and a cathode of the thyristor serves as the second terminal of the switching device; and
   a cathode of the zener diode is connected to the positive output terminal of the load branch, an anode of the zener diode is connected to the negative output terminal of the load branch via the first resistor and the second resistor, and the first filter capacitor is connected in parallel with the second resistor.

5. The open-circuit protection circuit of the constant current driving circuit for light emitting diodes according to claim 1, wherein, in each of the load branches,
   a dotted end of the secondary winding is connected to an anode of a first diode via a first output capacitor, and a cathode of the first diode is connected to an non-dotted end of the secondary winding;
   one terminal of the first output capacitor which is connected to the dotted end of the secondary winding serves as a positive output terminal of the load branch, and the other terminal of the first output capacitor which is connected to the anode of the first diode serves as a negative output terminal of the load branch; and
   a winding of the current sharing transformer provided in the load branch and the adjacent load branch is connected in series between the dotted end of the secondary winding and the positive output terminal of the load branch comprising the secondary winding.

6. The open-circuit protection circuit of the constant current driving circuit for light emitting diodes according to claim 5, wherein the processing unit comprises a second diode, a first capacitor and a switching device, wherein:
   a first terminal of the switching device is connected to the positive output terminal of the load branch, a second terminal of the switching device is connected to an anode of the second diode, and a cathode of the second diode is connected to the tap end of the secondary winding; and a control terminal of the switching device is connected to a control signal output terminal of the detection control unit; and
   the first capacitor is connected in parallel with the switching device between the first and second terminals of the switching device.

7. The open-circuit protection circuit of the constant current driving circuit for light emitting diodes according to claim 1, wherein a primary side of the transformer comprises a primary winding and a switch; the transformer and the switch form a flyback topology circuit; and
   a dotted end of the primary winding of the transformer is connected to one terminal of the switch, the other terminal of the switch is connected to a negative terminal of a power supply, and an non-dotted end of the primary winding of the transformer is connected to a positive terminal of the power supply.

8. An open-circuit protection circuit of a constant current driving circuit for light emitting diodes, comprising a transformer which comprises at least one secondary winding connected to at least two load branches, each of the load branches having a same structure; wherein:

each of the load branches and the secondary winding form a rectification loop, and the secondary winding has a tap end which divides the secondary winding into two secondary sub-windings;

the circuit further comprises a current sharing transformer connected in series in each of the load branches, wherein a primary current sharing winding of each current sharing transformer is respectively connected to a secondary sub-winding of a secondary winding corresponding to each of the load branches, and secondary current sharing windings of the current sharing transformers are connected in series sequentially; and each of the load branches is connected to an open-circuit protection module which comprises a detection control unit and a processing unit, wherein:

the detection control unit is configured to output a control signal to the processing unit when the detection control unit detects that an output voltage of the load branch or a voltage proportional to the output voltage is not less than a corresponding preset threshold; and the processing unit is configured to perform shorting between the tab end of the secondary winding and one terminal of the primary current sharing winding of the current sharing transformer which is not connected to the secondary winding once the control signal is received.

9. The open-circuit protection circuit of the constant current driving circuit for light emitting diodes according to claim 8, wherein, in each of the load branches, a dotted end of the secondary winding is connected to an anode of a first diode, and a cathode of the first diode is connected to an non-dotted end of the secondary winding via a first output capacitor;

one terminal of the first output capacitor which is connected to the cathode of the first diode serves as a positive output terminal of the load branch, and the other terminal of the first output capacitor serves as a negative output terminal of the load branch; and the primary current sharing winding of the current sharing transformer is connected in series between the non-dotted end of the secondary winding and the negative output terminal of the load branch comprising the secondary winding.

10. The open-circuit protection circuit of the constant current driving circuit for light emitting diodes according to claim 9, wherein the processing unit comprises a second diode, a first capacitor and a switching device, wherein:

an anode of the second diode is connected to the tap end of the secondary winding, and a cathode of the second diode is connected to a first terminal of the switching device; a second terminal of the switching device is connected to the negative output terminal of the load branch, and a control terminal of the switching device is connected to a control signal output terminal of the detection control unit; and the first capacitor is connected in parallel with the switching device between the first and second terminals of the switching device.

11. The open-circuit protection circuit of the constant current driving circuit for light emitting diodes according to claim 10, wherein the detection control unit comprises a zener diode, a first resistor, a second resistor and a first filter capacitor;

the switching device is a thyristor, an anode of the thyristor serves as the first terminal of the switching device, and a cathode of the thyristor serves as the second terminal of the switching device; and a cathode of the zener diode is connected to the positive output terminal of the load branch, an anode of the zener diode is connected to the negative output terminal of the load branch via the first resistor and the second resistor, and the first filter capacitor is connected in parallel with the second resistor.

12. The open-circuit protection circuit of the constant current driving circuit for light emitting diodes according to claim 8, wherein, in each of the load branches, a dotted end of the secondary winding is connected to an anode of a first diode via a first output capacitor, and a cathode of the first diode is connected to an non-dotted end of the secondary winding;

one terminal of the first output capacitor which is connected to the dotted end of the secondary winding serves as a positive output terminal of the load branch, and the other terminal of the first output capacitor which is connected to the anode of the first diode serves as a negative output terminal of the load branch; and the current sharing winding of the current sharing transformer is connected in series between the dotted end of the secondary winding and the positive output terminal of the load branch comprising the secondary winding.

13. The open-circuit protection circuit of the constant current driving circuit for light emitting diodes according to claim 12, wherein the processing unit comprises a second diode, a first capacitor and a switching device, wherein:

a first terminal of the switching device is connected to the positive output terminal of the load branch, a second terminal of the switching device is connected to an anode of the second diode, and a cathode of the second diode is connected to the tap end of the secondary winding; and a control terminal of the switching device is connected to a control signal output terminal of the detection control unit; and the first capacitor is connected in parallel with the switching device between the first and second terminals of the switching device.

14. The open-circuit protection circuit of the constant current driving circuit for light emitting diodes according to claim 8, wherein a primary side of the transformer comprises a primary winding and a switch; the transformer and the switch form a flyback topology circuit; and a dotted end of the primary winding of the transformer is connected to one terminal of the switch, the other terminal of the switch is connected to a negative terminal of a power supply, and an non-dotted end of the primary winding of the transformer is connected to a positive terminal of the power supply.

\* \* \* \* \*